US012644723B2

(12) United States Patent
Tran et al.

(10) Patent No.: US 12,644,723 B2
(45) Date of Patent: Jun. 2, 2026

(54) GENERATING A CUSTOMIZED DIGITAL MAP VIA A GENERATIVE MACHINE-LEARNED MODEL

(71) Applicant: Google LLC, Mountain View, CA (US)

(72) Inventors: Quinn Thuy Tran, Austin, TX (US); Joseph Edwin Johnson, Jr., Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 76 days.

(21) Appl. No.: 18/541,501

(22) Filed: Dec. 15, 2023

(65) Prior Publication Data

US 2025/0198790 A1      Jun. 19, 2025

(51) Int. Cl.
*G01C 21/00*        (2006.01)
*G06N 3/0475*        (2023.01)
(52) U.S. Cl.
CPC ..... *G01C 21/3804* (2020.08); *G01C 21/3881* (2020.08); *G06N 3/0475* (2023.01)
(58) Field of Classification Search
CPC ............ G01C 21/3804; G01C 21/3881; G06N 3/0475
See application file for complete search history.

(56) References Cited

U.S. PATENT DOCUMENTS

| | | |
|---|---|---|
| 2008/0051989 A1 | 2/2008 | Welsh |
| 2008/0177541 A1 | 7/2008 | Satomura |
| 2012/0143503 A1 | 6/2012 | Hirai et al. |
| 2022/0011132 A1* | 1/2022 | Jia et al. ................ G06N 20/00 |
| 2023/0296398 A1* | 9/2023 | Sanchez-Rosito et al. ................. G01C 21/3807 701/532 |
| 2024/0305862 A1* | 9/2024 | Corbillon et al. . H04N 21/4728 |
| 2024/0330579 A1* | 10/2024 | Saxena ................ G06F 40/106 |

FOREIGN PATENT DOCUMENTS

| | | |
|---|---|---|
| JP | 2013/080476 | 5/2013 |

* cited by examiner

*Primary Examiner* — Helal A Algahaim
(74) *Attorney, Agent, or Firm* — DORITY & MANNING, P.A.

(57) ABSTRACT

A computing device for generating a customized digital map includes one or more memories to store instructions and one or more processors to execute the instructions to perform operations, the operations including: receiving an input from a user relating to customizing features associated with a location viewable on a digital map; in response to receiving the input, implementing a generative machine-learned model to generate the customized digital map which depicts the location with one or more customized features which are generated via the generative machine-learned model based on the input; and providing the customized digital map for presentation via a display device.

20 Claims, 12 Drawing Sheets

<u>2000</u>

2000

RECEIVE INPUT RELATING TO A LOCATION 2100

GENERATE CONDITIONING PARAMETERS BASED ON THE INPUT 2200

IMPLEMENT GENERATIVE ML MODEL TO GENERATE MAP 2300

PROVIDE CUSTOMIZED DIGITAL MAP SATISFYING THE INPUT 2400

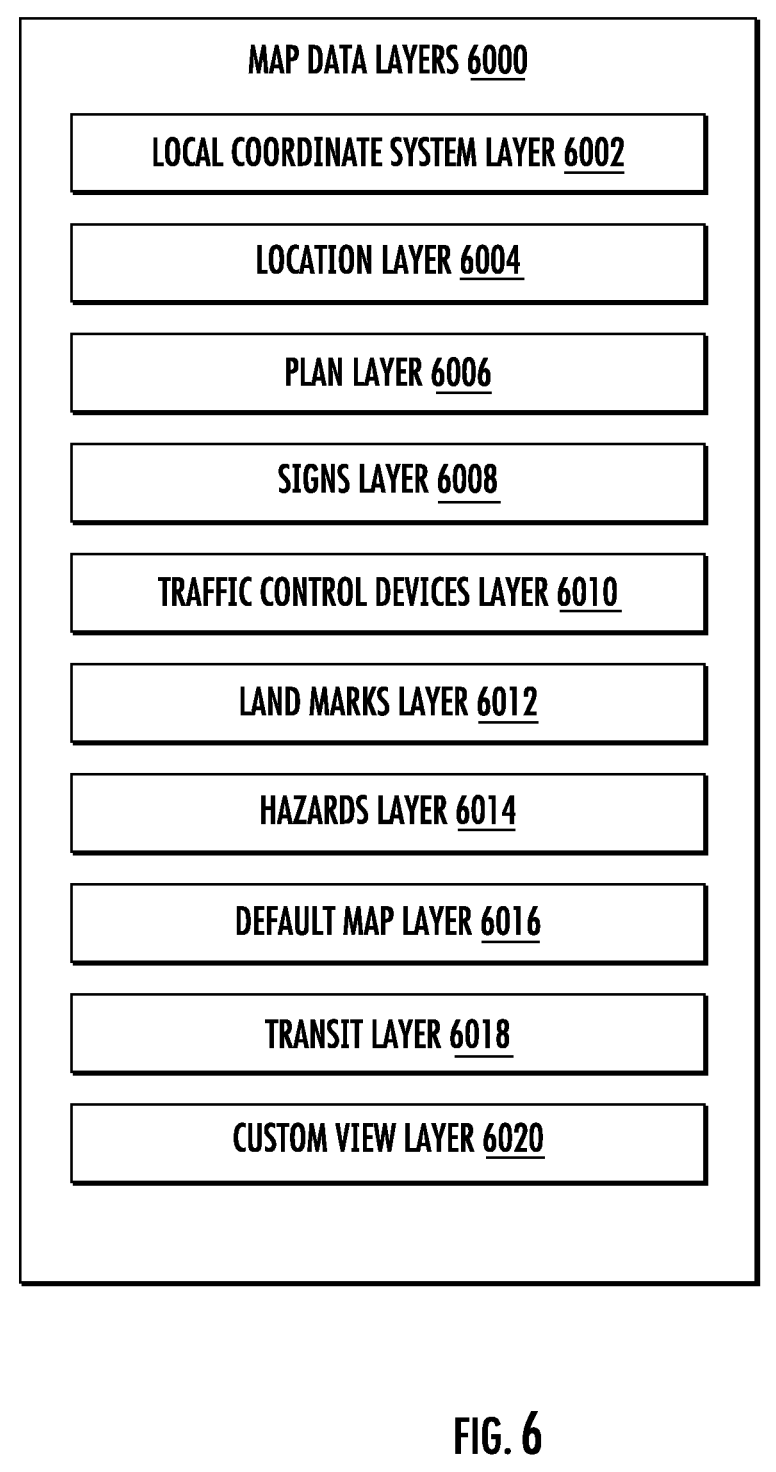

MAP DATA LAYERS 6000

LOCAL COORDINATE SYSTEM LAYER 6002

LOCATION LAYER 6004

PLAN LAYER 6006

SIGNS LAYER 6008

TRAFFIC CONTROL DEVICES LAYER 6010

LAND MARKS LAYER 6012

HAZARDS LAYER 6014

DEFAULT MAP LAYER 6016

TRANSIT LAYER 6018

CUSTOM VIEW LAYER 6020

FIG. 6

GENERATING A CUSTOMIZED DIGITAL MAP VIA A GENERATIVE MACHINE-LEARNED MODEL

FIELD

The disclosure relates generally to providing a customized digital map at a computing device via a generative machine-learned model. For example, the disclosure relates to methods and computing devices for providing a customized digital map relating to a location via a generative machine-learned model that is provided at the computing device associated with the user, in response to a user input relating to the location.

BACKGROUND

According to current methods, a user computing device downloads map and satellite imagery/tiles from a server computing system, for example, for navigation applications. Further, application programming interfaces (APIs) exist for users to customize these maps where the server computing system renders custom tiles and the user computing device downloads the custom tiles from the server computing system.

SUMMARY

Aspects and advantages of embodiments of the disclosure will be set forth in part in the following description, or can be learned from the description, or can be learned through practice of the example embodiments.

In one or more example embodiments, a computing device for generating a customized digital map is provided. For example, the computing device for generating a customized digital map includes: a display device; one or more memories configured to store instructions; and one or more processors configured to execute the instructions to perform operations, the operations comprising: receiving an input from a user relating to customizing features associated with a location viewable on a digital map; in response to receiving the input, implementing a generative machine-learned model to generate the customized digital map which depicts the location with one or more customized features which are generated via the generative machine-learned model based on the input; and providing the customized digital map for presentation via the display device.

In some implementations, the generative machine-learned model is provided at the computing device.

In some implementations, receiving the input from the user relating to customizing features associated with the location viewable on the digital map comprises receiving a semantic description of a tile associated with the digital map which is to be generated.

In some implementations, the generative machine-learned model is configured to generate the customized digital map by rendering a portion of the customized digital map which depicts the location with the one or more customized features, and the operations further comprise receiving a remaining portion of the customized digital map rendered by a server computing system.

In some implementations, the operations further comprise implementing one or more machine-learned models to smooth and mix the portion of the customized digital map rendered by the computing device and the remaining portion of the customized digital map rendered by the server computing system.

In some implementations, the operations further comprise receiving, prior to receiving the input from the user, one or more default tiles associated with the location, and the generative machine-learned model is configured to generate the customized digital map by referencing the one or more default tiles and the input to render the customized digital map which depicts the location with the one or more customized features.

In some implementations, the one or more default tiles associated with the location are received at a predetermined time, in accordance with a predetermined condition, or in accordance with a predetermined event.

In some implementations, the predetermined time occurs periodically, the predetermined condition is associated with network conditions of a network by which the one or more default tiles are received from a server computing system, and the predetermined event is associated with a state of the computing device.

In some implementations, the input indicates particular content which is to be omitted or reduced when generating the customized digital map, and implementing the generative machine-learned model to generate the customized digital map which depicts the location with the one or more customized features comprises omitting or reducing the particular content when generating the customized digital map.

In some implementations, receiving the input from the user relating to customizing features associated with the location viewable on the digital map comprises receiving a selection of a user interface element which corresponds to a customized map layer, and in response to the selection of the user interface element, implementing the generative machine-learned model to generate the customized digital map which depicts the location with one or more customized features which are generated via the generative machine-learned model based on the input.

In some implementations, the operations further comprise, in response to the selection of the user interface element, generating the customized map layer based on at least one of information associated with the user or contextual information associated with the location.

In some implementations, the computing device includes one or more databases configured to store a plurality of generative machine-learned models respectively associated with a plurality of different locations, and the operations further comprise retrieving, from among the plurality of generative machine-learned models, the generative machine-learned model associated with the location.

In some implementations, the input comprises a text query that specifies one or more objects to be associated with the location, and the digital map depicts the location including the one or more objects.

In some implementations, the generative machine-learned model has been fine-tuned based on a large parameter generative machine-learned model having a greater number of parameters than the generative machine-learned model.

In one or more example embodiments, a computer-implemented method for generating a customized digital map is provided. The computer-implemented method comprises receiving, by a computing device, an input from a user relating to customizing features associated with a location viewable on a digital map; in response to receiving the input, implementing, by the computing device, a generative machine-learned model to generate the customized digital map which depicts the location with one or more customized features which are generated via the generative machine-learned model based on the input; and providing, by the computing device, the customized digital map for presentation via a display device.

In some implementations, the generative machine-learned model is provided at the computing device.

In some implementations, receiving the input from the user relating to customizing features associated with the location viewable on the digital map comprises receiving a semantic description of a tile associated with the digital map which is to be generated.

In some implementations, implementing the generative machine-learned model comprises: rendering a portion of the customized digital map which depicts the location with the one or more customized features, and receiving a remaining portion of the customized digital map rendered by a server computing system.

In some implementations, the input indicates particular content which is to be omitted or reduced when the customized digital map is generated, and implementing the generative machine-learned model comprises omitting or reducing the particular content when generating the customized digital map.

In one or more example embodiments, a computer-readable medium (e.g., a non-transitory computer-readable medium) which stores instructions that are executable by one or more processors of a computing system is provided. In some implementations the computer-readable medium stores instructions which may include instructions to cause the one or more processors to perform one or more operations which are associated with any of the methods described herein (e.g., operations of the server computing system and/or operations of the computing device). For example, the operations may include: receiving an input from a user relating to customizing features associated with a location viewable on a digital map; in response to receiving the input, implementing a generative machine-learned model to generate a customized digital map which depicts the location with one or more customized features which are generated via the generative machine-learned model based on the input; and providing the customized digital map for presentation via a display device. The computer-readable medium may store additional instructions to execute other aspects of the server computing system and computing device and corresponding methods of operation, as described herein.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which:

FIG. 6 illustrates a block diagram including an example of map data layers, according to example embodiments of the disclosure;

DETAILED DESCRIPTION

Figure 1A:
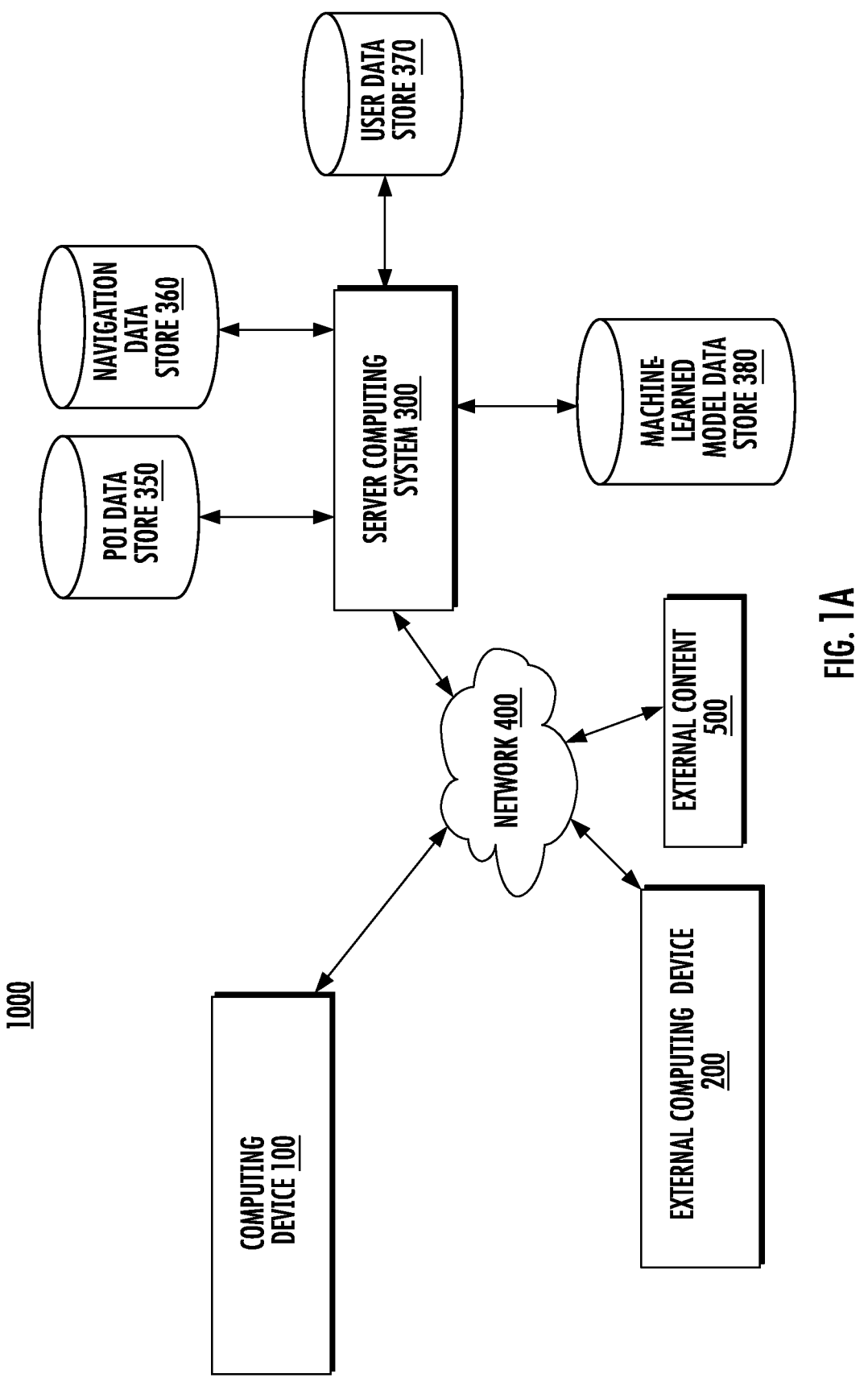
FIGS. 1A-1B depict example systems according to according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

According to current methods, a significant amount of bandwidth and compute resources are used to render and download map and satellite imagery/tiles from a server computing system to a user computing device. Further, application programming interfaces (APIs) exist for users to customize these maps where the server computing system renders custom tiles and the user computing device downloads the custom tiles from the server computing system. This approach requires network resources (e.g., bandwidth) to exchange data between the user computing device and server computing system and can be problematic in low bandwidth or low network coverage areas, particularly as each map can be rendered and downloaded multiple times to create different variations.

According to example embodiments of the disclosure, a user input which may include a semantic description of the map/tile to be rendered can be provided to the user computing device and then a generative machine-learned model provided at the user computing device can render customized maps (digital maps) directly at the user computing device, saving bandwidth and enabling high fidelity map use in low network coverage areas. By rendering maps on the device via a generative machine-learned model, customized or personalized content can be implemented with respect to a digital map while reducing bandwidth usage, including making more useful, task specific map tiles that can assist the user, removing constraints today which can require that map tiles be generically used by all users for all tasks.

According to the example embodiments of the disclosure, customized digital maps can be generated in real-time via an on-device generative machine-learned model, thus saving bandwidth, enabling personalization, and improving customer experience.

In some implementations, existing generative machine-learned models can be fine-tuned or distilled to improve their performance on specific tasks, including rendering map tiles. Thus, the generative machine-learned model for customizing a digital map can have improved speed and reduced size (thereby saving storage space) compared to existing models, and can be deployed on a user computing device more easily.

For example, a computing device (e.g., server computing system, training computer system, etc.) may be configured to fine-tune an existing generative machine-learned model on a dataset of map tiles to train a generative machine-learned model to generate realistic and accurate maps from text descriptions. The generative machine-learned model could also be distilled to remove unnecessary parameters and make it faster and smaller. For example, the computing device may be configured to fine-tune an existing model to be task specific such that a large parameter model (e.g., a large 55 billion parameter model like PaLI) can be distilled to a smaller parameter model (e.g., a billion parameters or less model).

Once trained, the generative machine-learned model could be used to render maps in real-time on user computing devices with limited bandwidth. For example, a user could provide an input including a text description relating to a location and the generative machine-learned model could generate a detailed map of that location which is customized according to the user's input, such as by showing specific types of businesses or landmarks or by depicting the businesses or landmarks in a particular manner.

An example semantic description can include a prompt such as "Generate a map tile of Boston Long Wharf near the Aquarium. Make the water deep blue with waves." The semantic description could include various other constraints or conditions such as "Make a coffee shop appear on the corner. The coffee shop's name is Tatte's Bakery." The user can also provide further context or inputs to the generative machine-learned model to shape the output, such as providing an image of the coffee shop's logo to render the sign and providing size information (e.g., "Make the sign somewhat large relative to the route. Render the start pin here and the destination pin here. Make the pins look nautical themed like a boat anchor.").

Computing resource usage and network resource usage are also improved according to the disclosed embodiments. For example, delegating implementation of the generative machine-learned model to the user computing device can reduce network traffic and reduce usage of server computing system (cloud) resources.

In some implementations, the generative machine-learned models may include generative adversarial networks, variational autoencoders, stable diffusion machine-learned models, visual transformers, etc. Further, methods including singular value decomposition, LU decomposition, and principal component analysis may be implemented by a computing device for dimensionality reduction to obtain generative machine-learned models which can be implemented by a user computing device.

In some implementations, the user computing device and server computing system may be configured to perform hybrid rendering, where the user computing device renders a portion of the map, and a remaining portion is rendered by the server computing system. For example, a machine-learned model (e.g., at the user computing device) can be configured to smooth and mix the portion of the map rendered at the server computing system and the portion of the map rendered at the user computing device so that the overall map has a consistent and similar appearance.

In some implementations, default tiles or starter tiles can be utilized as seed data by the user computing device where the generative machine-learned model is configured to reference the default tiles or starter tiles when rendering the map. In some implementations, the user computing device may be configured to download or store local templates including the default tiles or starter tiles received from the server computing system. For example, the default tiles or starter tiles may be downloaded by the user computing device under particular conditions (e.g., at a time when an available bandwidth is greater than a threshold value, when network traffic is below a threshold value, when the user computing device is connected to a WiFi network or a cellular network, etc.), in association with a particular event (e.g., during initial application install, during updates to the application, etc.), or at a particular time (e.g., every week, every month, etc.).

According to examples of the disclosure, each user can personalize their maps experience (e.g., according to the user's tastes or needs such as targeted establishments, categories or types of routes by task, etc.). For instance, if a user wants to go grocery shopping and view grocery stores, other content which might otherwise appear on the map may be visually cluttering. The additional content also requires rendering (either at the server computing system or user computing device). Therefore, the user can provide an input to the generative machine-learned model that non-relevant content be omitted from the map, be minimized, be displayed with less detail, etc., thereby saving computing resources.

As another example, if a user is interested in bike paths, the generative machine-learned model may be configured to focus on bike paths when generating the customized digital map. According to existing methods, when a user wishes to view bike paths on a map, the server computing system may render a map with bike paths at the relevant location, for example, by re-rendering the map tiles or by utilizing a map stored in a memory (cache) that may have been previously rendered and which satisfies the user's query. However, according to the examples of the disclosure, the generative machine-learned model may be configured to customize the map tiles in a manner that is particular to the user. For example, according to the user query or input or other conditions, the generative machine-learned model may be configured to not render portions of the map unrelated to biking such that the map only shows routes which can be used for bicycling and may show only stores or facilities which are relevant to cyclists (e.g., showing bike shops while not rendering fast food restaurants). Therefore, computing resources may be efficiently utilized by rendering only portions of the map relevant to the user input.

In some implementations, the generative machine-learned model may be configured to render locations or points-of-interest which may be of interest to the user. For example, the generative machine-learned model may be configured to determine that a location or point-of-interest may be of interest to a user based on the user input, based on contextual information associated with the user (e.g., user preferences, past purchases of the user, historical information associated with the user, based on interests of friends of the user, etc.), based on external information (e.g., current events, local alerts, traffic alerts, etc.). The generative machine-learned model may be configured to render the locations or points-of-interest in a manner that prominently displays the location or point-of-interest relative to other locations or points-of-interest (e.g., in a visually distinctive manner such as in an enlarged manner, use of bright colors, or in a highlighted manner). Further, the digital map can prominently display the location or point-of-interest in a stylized or thematic manner. For example, an icon or symbol representing the location or point-of-interest can match or correspond to the user input or query or can match or correspond to a context associated with the user (e.g., an icon displayed on the map representing a coffee shop may be shaped like a skateboard for a user who skateboards and is a regular coffee drinker).

According to examples of the disclosure, a generative machine-learned model can be configured to render tiles at the user computing device to satisfy a user's request to customize a map and/or in accordance with a task being executed by the user (e.g., requesting directions to a point-of-interest). In contrast to current approaches which provide generic maps shared by all users for all tasks, according to the examples disclosed herein, customization of the map can be achieved in real-time, improving a user experience and facilitating navigation (e.g., making it easier to add routes, make changes to routes, identify relevant locations or points-of-interest in a manner specific to the user, etc.).

One or more technical benefits of the disclosure also include generating a customized digital map associated with a location via one or more machine-learned models (e.g., generative machine-learned models) in response to receiving a query. For example, a generative machine-learned model may be provided at a user computing device to render maps on the user computing device where the maps are customized or have personalized content. Rendering maps at the user computing device via the generative machine-learned model reduces bandwidth usage compared to methods which require a user computing device to download tiles from a server computing system, and results in more useful, task specific map tiles that can assist the user, removing constraints today which can require that map tiles be generically used by all users for all tasks.

Another technical benefit of the disclosure includes providing fine-tuned or distilled generative machine-learned models for customizing a digital map. The fine-tuned or distilled generative machine-learned models can have improved speed and reduced size (thereby saving storage space) compared to existing models and can be deployed on a user computing device more easily.

Another technical benefit of the disclosure includes increasing device uptime by enabling map rendering at times when such map rendering may not be possible due to low bandwidth or reduced network availability.

Another technical benefit of the disclosure includes embodiments in which the user computing device is configured to omit (or minimize or display with less detail) non-relevant content from being displayed on the digital map generated via the generative machine-learned model, thereby saving computing resources (e.g., processing power) and resulting in faster performance.

Another technical benefit of the disclosure includes embodiments in which navigation can be performed more accurately or in an easier manner by displaying points-of-interest in a manner which is conducive or personalized to the user where waypoints, routes, points-of-interest, etc. can be easily identified by the user during navigation along a route.

Referring now to the drawings, FIG. 1A is an example system according to one or more example embodiments of the disclosure. FIG. 1A illustrates an example of a system 1000 which includes a computing device 100, an external computing device 200, a server computing system 300, and external content 500, which may be in communication with one another over a network 400. For example, the computing device 100 and the external computing device 200 can include any of a personal computer, a smartphone, a tablet computer, a global positioning service device, a smartwatch, and the like. The network 400 may include any type of communications network including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network 400 can use a wide variety of communication protocols (e.g., TCP/IP, HTTP, SMTP, FTP), encodings or formats (e.g., HTML, XML), and/or protection schemes (e.g., VPN, secure HTTP, SSL).

As will be explained in more detail below, in some implementations the computing device 100 and/or server computing system 300 may form part of a navigation and mapping system which can provide a customized digital map of a location to a user of the computing device 100 via a generative machine-learned model.

In some example embodiments, the server computing system 300 may obtain data from one or more of a POI data store 350, a navigation data store 360, a user data store 370, and a machine-learned model data store 380, to implement various operations and aspects of the navigation and mapping system as disclosed herein. The POI data store 350, navigation data store 360, user data store 370, and machine-learned model data store 380 may be integrally provided with the server computing system 300 (e.g., as part of the one or more memory devices 320 of the server computing system 300) or may be separately (e.g., remotely) provided. Further, POI data store 350, navigation data store 360, user data store 370, and machine-learned model data store 380 can be combined as a single data store (database), or may include a plurality of respective data stores. Data stored in one data store (e.g., the POI data store 350) may overlap with some data stored in another data store (e.g., the navigation data store 360). In some implementations, one data store (e.g., the machine-learned model data store 380) may reference data that is stored in another data store (e.g., the user data store 370).

POI data store 350 can store information about locations or points-of-interest, for example, for points-of-interest in an area or region associated with one or more geographic areas. A point-of-interest may include any destination or place. For example, a point-of-interest may include a restaurant, museum, sporting venue, concert hall, amusement park, school, place of business, grocery store, gas station, theater, shopping mall, lodging, and the like. Point-of-interest data which is stored in the POI data store 350 may include any information which is associated with the POI. For example, the POI data store 350 may include location information for the POI, hours of operation for the POI, a phone number for the POI, reviews concerning the POI, financial information associated with the POI (e.g., the average cost for a service provided and/or goods sold at the POI such as a meal, a ticket, a room, etc.), environmental information concerning the POI (e.g., a noise level, an ambiance description, a traffic level, etc., which may be provided or available in real-time by various sensors located at the POI), a description of the types of services provided and/or goods sold, languages spoken at the POI, a URL for the POI, image content associated with the POI, etc. For example, information about the POI may be obtainable from external content 500 (e.g., from webpages associated with the POI or from sensors disposed at the POI).

Navigation data store 360 may store or provide map data/geospatial data to be used by server computing system 300. Example geospatial data includes geographic imagery (e.g., digital maps, satellite images, aerial photographs, street-level photographs, synthetic models, etc.), tables, vector data (e.g., vector representations of roads, parcels, buildings, etc.), point of interest data, or other suitable geospatial data associated with one or more geographic areas. In some examples, the map data can include a series of sub-maps, each sub-map including data for a geographic area including objects (e.g., buildings or other static features), paths of travel (e.g., roads, highways, public transportation lines, walking paths, and so on), and other features of interest.

Navigation data store 360 can be used by server computing system 300 to provide navigational directions, perform point of interest searches, provide point of interest location or categorization data, determine distances, routes, or travel times between locations, or any other suitable use or task required or beneficial for performing operations of the example embodiments as disclosed herein.

In some examples, the user data store 370 can include a current user position and heading data. In some examples, the user data store 370 can include information regarding one or more user profiles, including a variety of user data such as user preference data, user demographic data, user calendar data, user social network data, user historical travel data, and the like. For example, the user data store 370 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. According to one or more examples of the disclosure, the data can be analyzed to determine preferences of the user with respect to a POI, for example, to automatically suggest or automatically provide customized features with respect to representing a location or representing attributes that is preferred by the user (e.g., displaying a POI using a favorite color of the user, displaying a POI using a logo or symbol associated with a favorite artist or favorite animal of the user, etc.), where a generative machine-learned model is implemented to generate the customized digital map with the location which is annotated or represented with the customized features associated with the user. The data can be analyzed to determine preferences of the user with respect to a POI, for example, to determine preferences of the user with respect to traveling (e.g., a mode of transportation, an allowable time for traveling, etc.), to determine possible recommendations for POIs for the user, to determine possible travel routes and modes of transportation for the user to a POI, and the like.

The user data store 370 is provided to illustrate potential data that could be analyzed, in some embodiments, by the server computing system 300 to identify user preferences, to recommend POIs, to determine possible travel routes to a POI, to determine modes of transportation to be used to travel to a POI, to determine videos of locations to provide to a computing device associated with the user, to generate customized digital maps, etc. However, such user data may not be collected, used, or analyzed unless the user has consented after being informed of what data is collected and how such data is used. Further, in some embodiments, the user can be provided with a tool (e.g., in a navigation application or via a user account) to revoke or modify the scope of permissions. In addition, certain information or data can be treated in one or more ways before it is stored or used, so that personally identifiable information is removed or stored in an encrypted fashion. Thus, particular user information stored in the user data store 370 may or may not be accessible to the server computing system 300 based on permissions given by the user, or such data may not be stored in the user data store 370 at all.

Machine-learned model data store 380 can store machine-learned models which can be retrieved and implemented by the server computing system 300 for generating distilled or fine-tuned machine-learned models (e.g., distilled or fine-tuned generative machine-learned models) that can be provided to the computing device 100. Machine-learned model data store 380 can also store distilled or fine-tuned machine-learned models (e.g., distilled or fine-tuned generative machine-learned models) which can be retrieved and implemented by the computing device 100. In some implementations, the computing device 100 can retrieve and implement machine-learned models which are large parameter models that have not been fine-tuned or distilled. The machine-learned models (including large parameter models and distilled or fine-tuned models) stored at the machine-learned model data store 380 can include a plurality of generative machine-learned models respectively associated with a plurality of different locations. In some implementations, the machine-learned models include a plurality of generative machine-learned models respectively associated with particular objects or structures which are provided at the plurality of different locations. The machine-learned models may include large language models (e.g., Bidirectional Encoder Representations from Transformers (BERT) large language model). The machine-learned models may include generative artificial intelligence (AI) models (e.g., Bard) which may implement generative adversarial networks (GANs), transformers, variational autoencoders (VAEs), neural radiance fields (NeRFs), and the like. The NeRFs may be trained to learn a continuous volumetric scene function, that can assign a color and volume density to any voxel in the space. The NeRF network's weights may be optimized to encode the representation of the scene so that the model can render novel views seen from any point in space.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The computing device 100, external computing device 200, and server computing system 300 can access external content 500 over network 400. External content 500 can be searched by computing device 100, external computing device 200, and server computing system 300 according to known searching methods and search results can be ranked according to relevance, popularity, or other suitable attributes, including location-specific filtering or promotion.

Figure 1B:
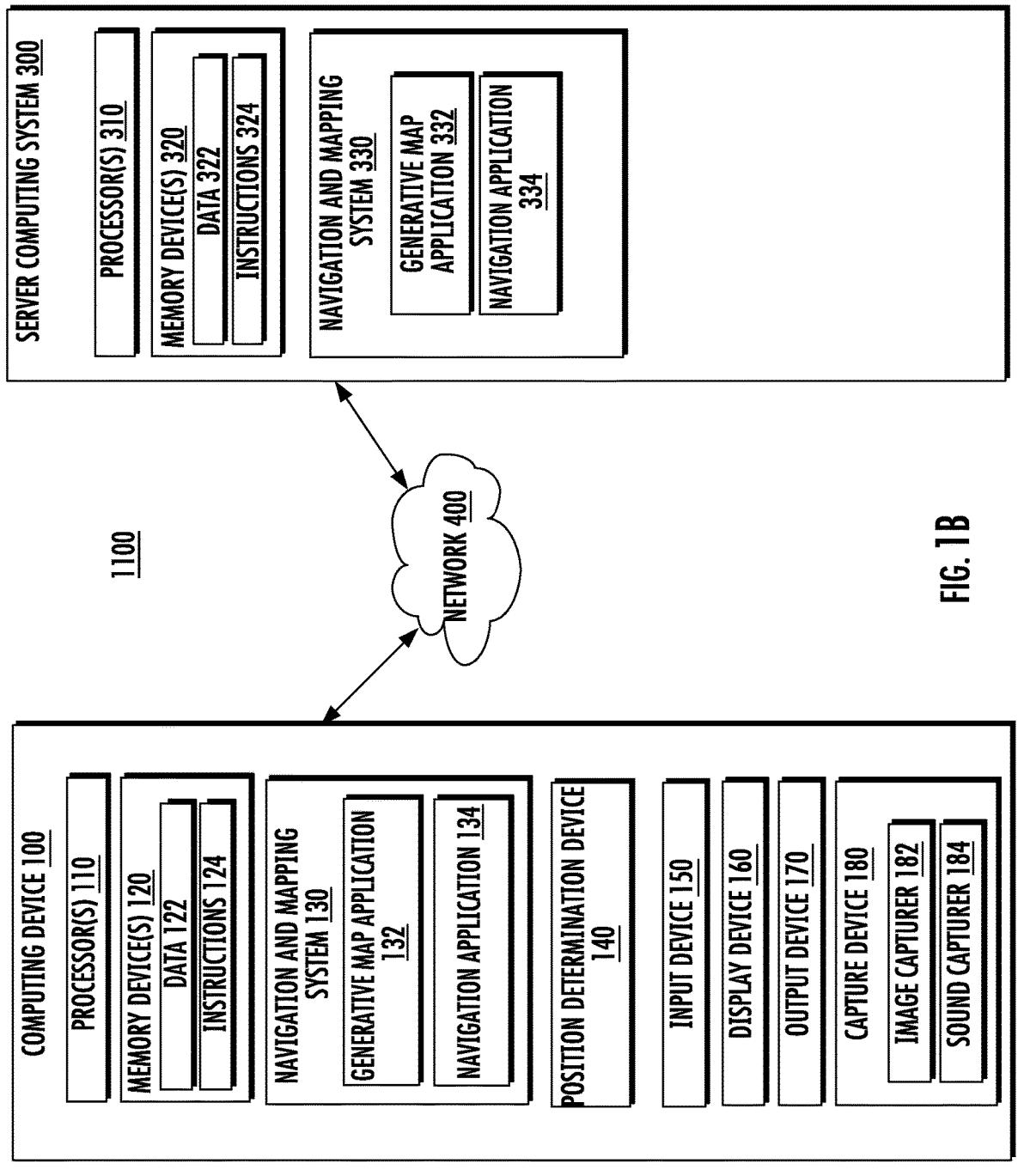

Referring now to FIG. 1B, example block diagrams of a computing device and server computing system according to one or more example embodiments of the disclosure will now be described. Although computing device 100 is represented in FIG. 1B, features of the computing device 100 described herein are also applicable to the external computing device 200.

The computing device 100 may include one or more processors 110, one or more memory devices 120, a navigation and mapping system 130, a position determination device 140, an input device 150, a display device 160, an output device 170, and a capture device 180. The server computing system 300 may include one or more processors 310, one or more memory devices 320, and a navigation and mapping system 330.

For example, the one or more processors 110, 310 can be any suitable processing device that can be included in a computing device 100 or server computing system 300. For example, the one or more processors 110, 310 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310 can be a single processor or a plurality of processors that are operatively connected, for example in parallel.

The one or more memory devices 120, 320 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120, 320 are not limited to the above description, and the one or more memory devices 120, 320 may be realized by other various devices and structures as would be understood by those skilled in the art.

For example, the one or more memory devices 120 can store instructions, that when executed, cause the one or more processors 110 to execute a generative map application 132, and to execute the instructions to perform operations including: receiving an input from a user relating to customizing features associated with a location viewable on a digital map; in response to receiving the input, implementing a generative machine-learned model to generate a customized digital map which depicts the location with one or more customized features which are generated via the generative machine-learned model based on the input; and providing the customized digital map for presentation via the display, as described according to examples of the disclosure.

One or more memory devices 320 can also include data 322 and instructions 324 that can be retrieved, manipulated, created, or stored by the one or more processors 310. In some example embodiments, such data can be accessed and used as input to implement generative map application 332, and to execute the instructions to perform operations including: receiving an input from a user relating to customizing features associated with a location viewable on a digital map; in response to receiving the input, implementing a generative machine-learned model to generate a customized digital map which depicts the location with one or more customized features which are generated via the generative machine-learned model based on the input; and providing the customized digital map for presentation via the display, as described according to examples of the disclosure.

In some example embodiments, the computing device 100 includes a navigation and mapping system 130. For example, the navigation and mapping system 130 may include the generative map application 132 and a navigation application 134.

According to examples of the disclosure, the generative map application 132 may be executed by the computing device 100 to provide a user of the computing device 100 a way to customize one or more features or points-of-interest associated with a digital map that is presented to the user via the display device 160. The generative map application 132 may be part of navigation application 134 or a separate mapping application, or may be a standalone application. The generative map application 132 may be configured to be dynamically interactive according to various user inputs. For example, the generative map application 132 may be configured to modify or customize a digital map in real-time in response to a user input or query by implementing the generative machine-learned model (e.g., a voice input which requests that an object in the digital map be shown with a favorite color of the user and have a particular theme). The generative map application 132 may be configured to dynamically generate the customized digital map relating to the location (e.g., in real-time) according to the user input. Further aspects of the generative map application 132 will be described herein.

In some examples, one or more aspects of the generative map application 132 may be implemented by the generative map application 332 of the server computing system 300 which may be remotely located, to generate and/or provide a customized digital map in response to receiving an input from a user. In some examples, one or more aspects of the generative map application 332 may be implemented by the generative map application 132 of the computing device 100, to generate and/or provide a customized digital map in response to receiving an input from a user.

According to examples of the disclosure, the navigation application 134 may be executed by the computing device 100 to provide a user of the computing device 100 a way (route) to navigate to a location. The navigation application 134 can provide navigation services to a user. In some examples, the navigation application 134 can facilitate a user's access to a server computing system 300 that provides navigation services. In some example embodiments, the navigation services include providing directions to a specific location such as a POI. For example, a user can input a destination location (e.g., an address or a name of a POI or a category of a POI). In response, the navigation application 134 can, using locally stored map data for a specific geographic area and/or map data provided via the server computing system 300, provide navigation information allowing the user to navigate to the destination location. For example, the navigation information can include turn-by-turn directions from a current location (or a provided origin point or departure location) to the destination location. For example, the navigation information can include a travel time (e.g., estimated or predicted travel time) from a current location (or a provided origin point or departure location) to the destination location.

The navigation application 134 can provide, via a display device 160 of the computing device 100, a visual depiction of a geographic area. The visual depiction of the geographic area may include one or more streets, one or more points of interest (including buildings, landmarks, and so on), and a highlighted depiction of a planned route. In some examples, the navigation application 134 can also provide location-based search options to identify one or more searchable points of interest within a given geographic area. In some examples, the navigation application 134 can include a local copy of the relevant map data. In other examples, the navigation application 134 may access information at server computing system 300 which may be remotely located, to provide the requested navigation services.

In some examples, the navigation application 134 can be a dedicated application specifically designed to provide navigation services. In other examples, the navigation application 134 can be a general application (e.g., a web browser) and can provide access to a variety of different services including a navigation service via the network 400.

For example, the navigation and mapping system 130 may store customized digital maps which were previously generated using one or more machine-learned models (e.g., generative machine-learned models) in the one or more memory devices 120 (e.g., in cache). The customized digital maps may be categorized or classified according to a location, a context in which the customized digital maps were generated (e.g., according to a type of POI, according to an activity associated with an input of the user which caused the customized digital map to be generated, a time of day, a time of year, weather conditions, lighting conditions, etc.). For example, navigation data store 360 may be configured to store customized digital maps which are generated using one or machine-learned models stored at machine-learned model data store 380. An example customized digital map may include a customized digital map which is associated with a particular bike route that the user takes to work, a customized digital map which is associated with a favorite type of food of the user which is served at restaurants in an area where the user lives, a customized digital map which is associated with favorite color of the user where buildings relevant to the user input are displayed on the map using the favorite color, etc. In some implementations, the computing device 100 may be configured to retrieve the customized digital map from the navigation data store 360 (or from a local memory) when the customized digital map matches or corresponds to a query or input from a user requesting a customized digital map.

For example, the navigation and mapping system 130 (e.g., generative map application) may be configured to generate graphical representations of objects (e.g., buildings, roads, landmarks, etc.). For example, the navigation and mapping system 130 (e.g., generative map application 132) may be configured to generate graphical representations of objects (e.g., buildings, roads, landmarks, etc.) using one or more machine-learned models (e.g., generative machine-learned models) in response to a user input that causes a customized digital map to be generated which includes the graphical representations of the objects. For example, the graphical representations may be generated based on images provided by a user or based on images from other external sources.

For example, the navigation and mapping system 130 (e.g., generative map application 132) may be configured to convert user-generated media content to a generic form to anonymize the media content (e.g., by converting a real-world image of a person or animal positioned at a location to a two-dimensional or three-dimensional digital avatar which represents the person or animal).

In some implementations, navigation and mapping system 130 (e.g., generative map application 132) may be configured to utilize sensor data obtained by one or more sensors (e.g., at the computing device 100 or elsewhere) to generate a customized digital map that indicates a state of a location, in response to receiving an input from a user relating to the location. For example, sensor data obtained by one or more sensors (e.g., at the computing device 100 or elsewhere) may indicate how many people are present at a location (e.g., based on the number of smartphones or other computing devices detected at the location). For example, navigation and mapping system 130 (e.g., generative map application 132) may generate graphical representations of the location according to the number of people, to accurately represent the location and depict a state of the location. For example, the navigation and mapping system 130 (e.g., generative map application 132) may be configured to generate graphical representations of the location using one or more machine-learned models (e.g., generative machine-learned models) in response to a user input that causes a customized digital map to be generated which includes the graphical representation indicating a state of the location. For example, a graphical representation of the location may include an icon or graphical object which is shaded in a manner which represents or indicates the state of the location (e.g., a darker shade indicating a busy or crowded location and a lighter shade indicating a less busy or less crowded location).

In some example embodiments, the computing device 100 includes a position determination device 140. Position determination device 140 can determine a current geographic location of the computing device 100 and communicate such geographic location to server computing system 300 over network 400. The position determination device 140 can be any device or circuitry for analyzing the position of the computing device 100. For example, the position determination device 140 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining a position of the computing device 100.

The computing device 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), a track ball, a remote controller, a portable (e.g., a cellular or smart) phone, a tablet PC, a pedal or footswitch, a virtual-reality device, and so on. The input device 150 may further include a haptic device to provide haptic feedback to a user. The input device 150 may also be embodied by a touch-sensitive display having a touchscreen capability, for example. For example, the input device 150 may be configured to receive an input from a user associated with the input device 150 for customizing a digital map.

The computing device 100 may include a display device 160 which displays information viewable by the user (e.g., a map, an immersive video of a location, a user interface screen, etc.). For example, the display device 160 may be a non-touch sensitive display or a touch-sensitive display. The display device 160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 160 can be used by the navigation and mapping system 130 provided at the computing device 100 to display information to a user relating to an input (e.g., information relating to a location of interest to the user, a user interface screen having user interface elements which are selectable by the user, etc.). Navigational information can include, but is not limited to, one or more of a digital map of a geographic area (e.g., an overhead view of the geographic area, a perspective or street-view of the geographic area, etc.), the position of the computing device 100 in the geographic area, a route through the geographic area designated on the map, one or more navigational directions (e.g., turn-by-turn directions through the geographic area), travel time for the route through the geographic area (e.g., from the position of the computing device 100 to a POI), and one or more points-of-interest within the geographic area.

The computing device 100 may include an output device 170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. According to various examples of the disclosure, the output device 170 may include a speaker which outputs sound which is associated with a location in response to a user inputting a query or input relating to a location that is provided as an input to a generative machine-learned model which generates (renders) the customized digital map.

The computing device 100 may include a capture device 180 that is capable of capturing media content, according to various examples of the disclosure. For example, the capture device 180 can include an image capturer 182 (e.g., a camera) which is configured to capture images (e.g., photos, video, and the like) of a location. For example, the capture device 180 can include a sound capturer 184 (e.g., a microphone) which is configured to capture sound or audio (e.g., an audio recording) of a location. The media content captured by the capture device 180 may be transmitted to one or more of the server computing system 300, POI data store 350, navigation data store 360, user data store 370, and machine-learned model data store 380, for example, via network 400. For example, in some implementations imagery may be used to generate a customized digital map and in some implementations the media content can be provided as an input to a generative machine-learned model to generate the customized digital map relating to a location, etc.

In accordance with example embodiments described herein, the server computing system 300 can include one or more processors 310 and one or more memory devices 320 as described herein. The server computing system 300 may also include a navigation and mapping system 330 which is similar to the navigation and mapping system 130 described herein.

For example, the navigation and mapping system 330 may include a generative map application 332 which performs functions similar to those discussed above with respect to generative map application 132. In some implementations, one or more machine-learned models (e.g., generative machine-learned models) associated with the navigation and mapping system 330 may be configured to generate content to be included in a customized digital map. For example, one or more machine-learned models (e.g., generative machine-learned models) associated with the navigation and mapping system 330 may be configured to render certain portions of a customized digital map that is transmitted to the computing device 100 where the computing device 100 is configured to render remaining portions of the customized digital map via one or more machine-learned models (e.g., generative machine-learned models) associated with the navigation and mapping system 130. For example, a size of the portion to be rendered by the navigation and mapping system 330 may vary according to a network status (e.g., an available bandwidth, a channel utilization status, a latency status, a throughput rate, etc.). In some implementations, one or more machine-learned models associated with the navigation and mapping system 330 may be configured to process a user input to generate information (e.g., semantic information) which can then be provided as an input to one or more other machine-learned models (e.g., generative machine-learned models) associated with the navigation and mapping system 330, to generate the content to be included in the customized digital map.

Figure 2:
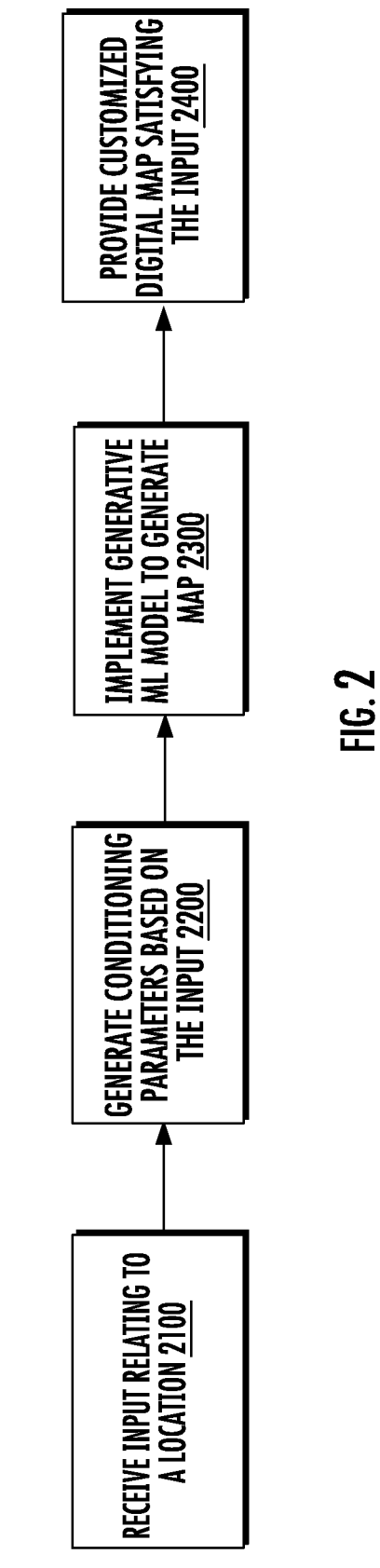
FIG. 2 illustrates a flow diagram of an example, non-limiting computer-implemented method, according to one or more example embodiments of the disclosure.
Figure 3:
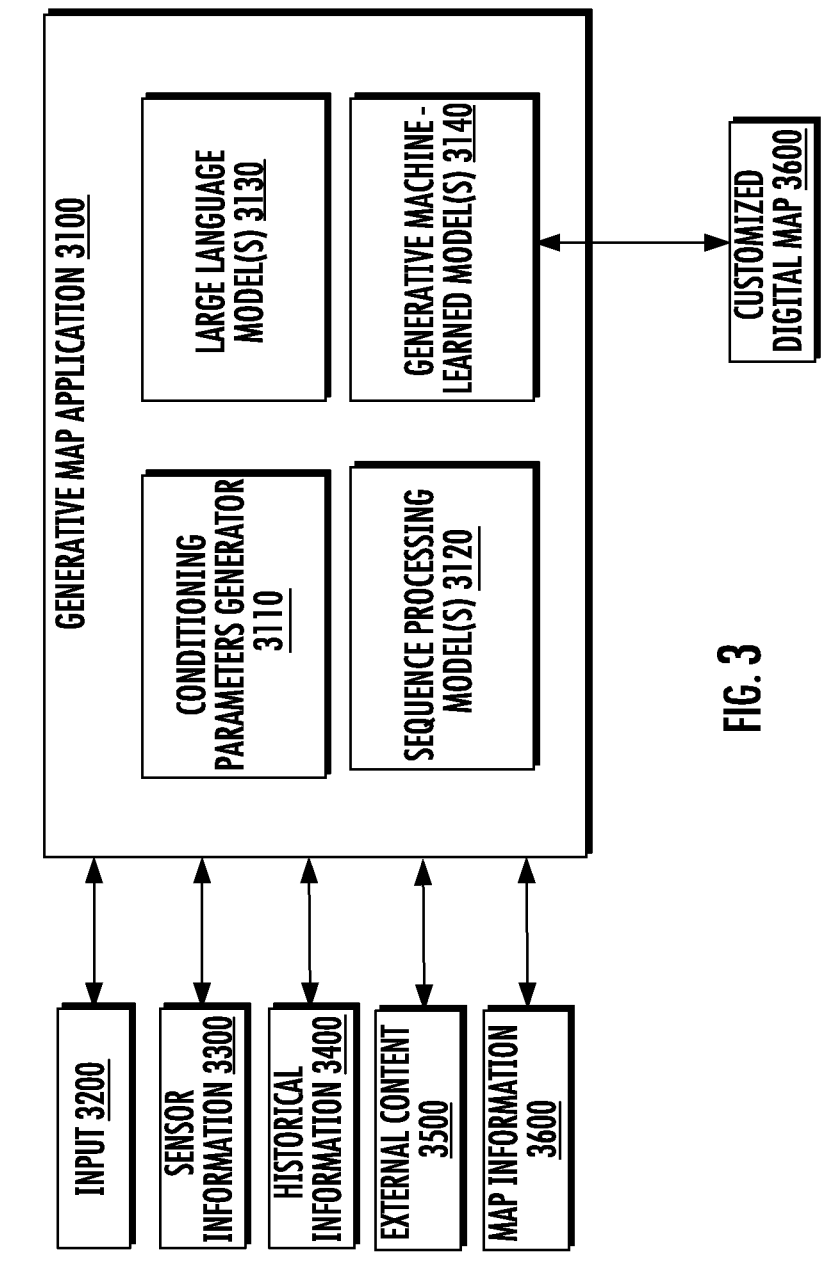
FIG. 3 depicts an example block diagram of a computing device, according to one or more example embodiments of the disclosure.

Examples of the disclosure are also directed to computer implemented methods for generating a customized digital map in response to receiving a user query or input and using one or more generative machine-learned models. FIG. 2 illustrates a flow diagram of an example, non-limiting computer-implemented method, according to one or more example embodiments of the disclosure. FIG. 3 illustrates a block diagram of a generative map application, according to one or more example embodiments of the disclosure.

The flow diagram of FIG. 2 illustrates a method 2000 for generating a customized digital map via a generative machine-learned model in response to receiving an input. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 2, at operation 2100 the method 2000 includes a computing device receiving an input from a user relating to a location. As described herein, the computing device may be embodied as computing device 100, server computing system 300, or combinations thereof. For example, the input may be provided by the user via input device 150. For example, the input may be in the form of a question, command, or description. For example, a user may provide a query to the computing device relating to the location (e.g., an input such as "Generate a map tile of Elliot Bay near downtown Seattle. Make the water emerald-colored with waves", or a request such as "show me the fastest route from Pike Place to the library with a yellow-brick road"). The input may be provided or input to navigation application 134, navigation application 334, generative map application 132, or generative map application 332, for example.

In some implementations, a response to the input may be processed at computing device 100 without involving the server computing system 300. In some implementations, the input may be transmitted from computing device 100 to server computing system 300 and at least part of the response to the input may be processed by the server computing system 300. For example, the input relating to the location may be associated with various conditions (e.g., a particular time, lighting conditions, weather conditions, and the like). For example, generative map application 132 may be configured to generate a customized digital map which reflects a current weather status of the location (e.g., having a fog overlay). For example, generative map application 332 may be configured to generate a portion of the customized digital map.

At operation 2200, the computing device may be configured to, in response to receiving the input, generate conditioning parameters based at least in part on the input, wherein the conditioning parameters provide values for one or more conditions associated with a customized digital map to be rendered which relates to the location. For example, referring to FIG. 3, generative map application 3100 (which may correspond to generative map application 132 and/or generative map application 332) may include a conditioning parameters generator 3110, one or more sequence processing models 3120, one or more large language models 3130, and one or more generative machine-learned models 3140. The generative map application 3100 may receive an input 3200 from a user as discussed above with respect to operation 2100 of FIG. 2. Conditioning parameters generator 3110 may be configured to generate conditioning parameters based at least in part on the input, wherein the conditioning parameters provide values for one or more conditions associated with a customized digital map to be rendered which relates to the location.

To generate the conditioning parameters, the conditioning parameters generator 3110 may be configured to retrieve current values for the one or more conditions at the location. In some implementations, the conditioning parameters generator 3110 may be configured to retrieve current values for the one or more conditions at the location based on sensor information 3300 which may correspond to data output by one or more sensors. The one or more sensors may be provided at the computing device or be provided externally (e.g., sensors disposed at the location) and can provide information regarding a state of the location. For example, current values associated with temperature data, lighting data, noise data, occupancy data, etc., may be retrieved by the conditioning parameters generator 3110 for various conditions (e.g., a temperature condition, a lighting condition, a noise condition, an occupancy condition, etc.) at the location.

In some implementations, to generate the conditioning parameters, the conditioning parameters generator 3110 may be configured to extract the values for the one or more conditions from the input. The input may include information indicative of the user's intent or requirements. In some implementations, the conditioning parameters generator 3110 (or the one or more sequence processing models 3120 or the one or more large language models 3130) may be configured to extract information from the input 3200 to identify values for the one or more conditions at the location, and the conditioning parameters generator 3110 may be configured to generate the conditioning parameters based on the extracted values. For example, the input itself may identify a color (e.g., "emerald") or an attribute or feature (e.g., "brick road") that can be used to generate the conditioning parameters.

To generate the conditioning parameters, the conditioning parameters generator 3110 may be configured to infer the values for the one or more conditions from the input. The input may include information indicative of the user's intent or requirements. In some implementations, the conditioning parameters generator 3110 (or the one or more sequence processing models 3120 or the one or more large language models 3130) may be configured to infer information from the input 3200 to identify values for the one or more conditions at the location, and the conditioning parameters generator 3110 may be configured to generate the conditioning parameters based on the inferred values. For example, the input may include a reference to "downtown" and the conditioning parameters generator 3110 (or the one or more sequence processing models 3120 or the one or more large language models 3130) may be configured to infer a location in the city in which the user is located that corresponds to the downtown area of the city.

In some implementations, the conditioning parameters generator 3110 may be configured to infer the values for the one or more conditions from the input by providing the input to one or more sequence processing models 3120, wherein the one or more sequence processing models 3120 are configured to output the values for the one or more conditions in response to or based on the query. The one or more sequence processing models 3120 may include one or more machine-learned models which are configured to process and analyze sequential data and to handle data that occurs in a specific order or sequence, including time series data, natural language text, or any other data with a temporal or sequential structure.

The one or more sequence processing models 3120 may receive an input including text and tokenize the input by breaking down the sequence of text into small units (tokens) to provide a structured representation of the input sequence. The one or more sequence processing models 3120 may represent the tokens as vectors in a continuous vector space by mapping each token to a high-dimensional vector, where the relationships between tokens (words) are reflected in the geometric relationships between their corresponding vector. For example, the one or more sequence processing models 3120 may receive an input including the text "yellow brick road" and tokenize the input by breaking down the sequence of text into small units (tokens) (e.g., "yellow," "brick," and "road"), thereby providing a structured representation of the input sequence. In a word embedding, semantically similar words are closer together in the vector space. For example, the vectors for "road" and "street" might be close to each other because of their semantic relationship, while the vectors for "brick" and "dirt" may be far apart compared to the vectors for "brick" and "asphalt".

For example, the input may include a request to provide a customized digital map relating to a state of various restaurants and to depict whether the various restaurants are busy in a particular manner. The one or more sequence processing models 3120 may be configured to tokenize and embed the input and infer a value for a "busy" based on the query, based on semantic relationships with other vectors in the vector space, and based on other data that is represented as vectors in the vector space (e.g., input sequence data which may include raw data relating to what may generally be considered as a busy restaurant) to infer that a restaurant which is at least 80% full compared to a known capacity of the restaurant can be considered to be busy, or having a current wait time longer than 30 minutes is considered to be busy, or having no available reservations is considered to be busy, etc.

To generate the conditioning parameters, the conditioning parameters generator 3110 may be configured to predict future values for the one or more conditions based on current values for the one or more conditions at the location and/or based on historical values for the one or more conditions at the location. The input may include information indicative of the user's intent or requirements. In some implementations, the conditioning parameters generator 3110 (or the one or more sequence processing models 3120 or the one or more large language models 3130) may be configured to predict future values for the one or more conditions at the location, and the conditioning parameters generator 3110 may be configured to generate the conditioning parameters based on the predicted future values. For example, the input may indicate that the user would like a representation of a location at a future time or date, and the conditioning parameters generator 3110 (or the one or more sequence processing models 3120 or the one or more large language models 3130) may be configured to predict values for the one or more conditions at the location according to the input. In some implementations, the conditioning parameters generator 3110 may be configured to retrieve current values for the one or more conditions at the location based on sensor information 3300 which may correspond to data output by one or more sensors or based on external content 3500 (e.g., information extracted from websites or other sources of information which may include map information). The one or more sensors may be provided at the computing device or be provided externally (e.g., sensors provided at external computing devices disposed at the location). For example, current values associated with temperature data, lighting data, noise data, occupancy data, etc., may be retrieved by the conditioning parameters generator 3110 for various conditions (e.g., a temperature condition, a lighting condition, a noise condition, an occupancy data, etc.) at the location. In some implementations, the conditioning parameters generator 3110 may be configured to retrieve historical values for the one or more conditions at the location based on historical information 3400 which may be stored at various computing devices (e.g., one or more of computing device 100, external computing device 200, server computing system 300, external content 500, POI data store 350, user data store 370, etc.). For example, historical values associated with temperature data, lighting data, noise data, occupancy data, etc., may be retrieved by the conditioning parameters generator 3110 for various conditions (e.g., a temperature condition, a lighting condition, a noise condition, an occupancy condition, etc.) at the location.

For example, the generative map application 3100 (e.g. conditioning parameters generator 3110) may be configured to implement one or more machine-learned models to predict future values for one or more conditions based on current values and/or historical values for the one or more conditions For example, the generative map application 3100 may be configured to utilize one or more forecasting methods (e.g., linear regression, autoregressive-integrated moving average models, exponential smoothing state space models) and/or neural networks (long short-term memory networks, gated recurrent unit networks, feedforward neural networks, etc.) for predicting values for the one or more conditions based on current values and/or historical values for the one or more conditions. Thus, to generate a customized digital map showing a particular condition relating to a location, (e.g., a closed or open state of a restaurant, a traffic condition of a route, etc.) according to one or more predicted future values, the generative map application 3100 may be configured to generate a customized digital map based on a predicted future values for one or more conditions (e.g., a predicted value for a traffic condition based on historical traffic information and current traffic information).

At operation 2300, the computing device may be configured to generate, using one or more generative machine-learned models, the customized digital map, wherein the customized digital map which depicts the location with one or more customized features which are generated via the generative machine-learned model based on the input (e.g., a route that is displayed in a particular manner specified by the user, terrain that is displayed in a particular manner specified by the user, points-of-interest that are displayed in a particular manner specified by the user, etc.) and with the values for the one or more conditions. For example, generative map application 3100 may be configured to generate, using the one or more generative machine-learned models 3140, the customized digital map 3700.

The one or more generative machine-learned models 3140 may include a deep neural network or a generative adversarial network (GAN), variational autoencoders, stable diffusion machine-learned models, visual transformers, neural radiance fields (NeRFs), etc., to generate the customized digital map which depicts the location with one or more customized features with values for conditions associated with the one or more customized features. For example, the computing device may include a database (e.g., machine-learned model data store 380) which is configured to store a plurality of generative machine-learned models respectively associated with a plurality of different locations. In some implementations, the computing device may be configured to retrieve, from among the one or more generative machine-learned models 3140, a generative machine-learned model associated with a particular location relating to the input.

In some implementations, the one or more generative machine-learned models 3140 may be trained on a large dataset of digital maps with corresponding information about the conditions associated with each digital map. These conditions could include variables like time of day, weather, lighting, object placement, occupancy, color, traffic, etc. During training, the one or more generative machine-learned models 3140 learn relationships between the visual elements in a digital map and conditions that influence them. This may involve the computing device adjusting each generative machine-learned model's internal parameters to generate realistic or accurate digital maps based on the training data. The one or more generative machine-learned models 3140 may be trained on one or more training datasets including a plurality of reference images of the location. The one or more training datasets may include values for the one or more conditions for at least some of the plurality of reference images.

In some implementations, the one or more generative machine-learned models 3140 are configured to generate the customized digital map 3700 based on the location as indicated in the input and the values for one or more conditions associated with the features to be customized and to be rendered at the location. For example, if the query indicates a theme (e.g., a nautical theme) for a route, the one or more generative machine-learned models 3140 may be configured to generate a customized digital map 3700 by conditioning the one or more generative machine-learned models 3140 with the conditioning parameters. For example, the one or more generative machine-learned models 3140 may be configured to consider the conditioning parameters (and corresponding values for the one or more conditions) to make decisions for rendering the customized digital map. For example, in some implementation the one or more generative machine-learned models 3140 may be configured to utilize an existing or pre-stored base digital map (default digital map) (e.g., based on the map information 3600) of the location and then render particular tiles of the existing or pre-stored base digital map which are relevant to the input so as to have a nautical theme for tiles associated with the route while maintaining tiles from the existing or pre-stored base digital map which are not associated with or relevant to the route or input. The one or more generative machine-learned models 3140 may be configured to output the customized digital map 3700 that depicts the location with one or more customized features with the values for conditions associated with the customized features, matching the criteria provided in the input 3200 and conditioning parameters generated by the conditioning parameters generator 3110. In some implementations, the computing device may be configured to implement post-processing operations to enhance the quality of the customized digital map (e.g., smoothing operations), add special effects, or fine-tune details.

At operation 2400, the computing device may be configured to provide the customized digital map 3700 satisfying the input 3200. For example, the input may include a text query that specifies one or more objects to be included in the customized digital map and the customized digital map 3700 which is generated may depict the one or more objects. For example, the customized digital map 3700 may be provided for presentation on the display device 160 of computing device 100. In some implementations, the server computing system 300 may provide (transmit) the customized digital map 3700 or a portion of the customized digital map 3700 to computing device 100 or the server computing system 300 may provide access to the customized digital map 3700 to the computing device 100. For example, the generated customized digital map 3700 may be stored at one or more computing devices (e.g., one or more of computing device 100, external computing device 200, server computing system 300, external content 500, POI data store 350, user data store 370, etc.).

In some implementations, after the customized digital map is generated, the user can provide feedback or a further input to refine or change the customized digital map, and operations 2100 through 2400 can be repeated such that the computing device is configured to generate, using the one or more generative machine-learned models, an adjusted (refined, modified, etc.) customized digital map, for example, in real-time. The adjusted customized digital map depicts the location with the one or more customized features as further specified by the user in the further input.

In the examples described with respect to FIGS. 2 and 3, the computing device may dynamically (e.g., in real-time) generate the customized digital map 3700 relating to the location in response to receiving the input at operation 2100. In some implementations however, a customized digital map which satisfies the request received at operation 2100 may be prestored or preexisting and may be stored at one or more computing devices (e.g., one or more of computing device 100, external computing device 200, server computing system 300, external content 500, POI data store 350, user data store 370, etc.). Therefore, in such a case operations 2200 and 2300 may be omitted while an operation of searching for the customized digital map which satisfies the conditions of the input may be performed as an intermediate operation between operations 2100 and 2400. Accordingly, the responsiveness of the computing device to the request may be faster as less operations are performed or needed.

Figure 4A:
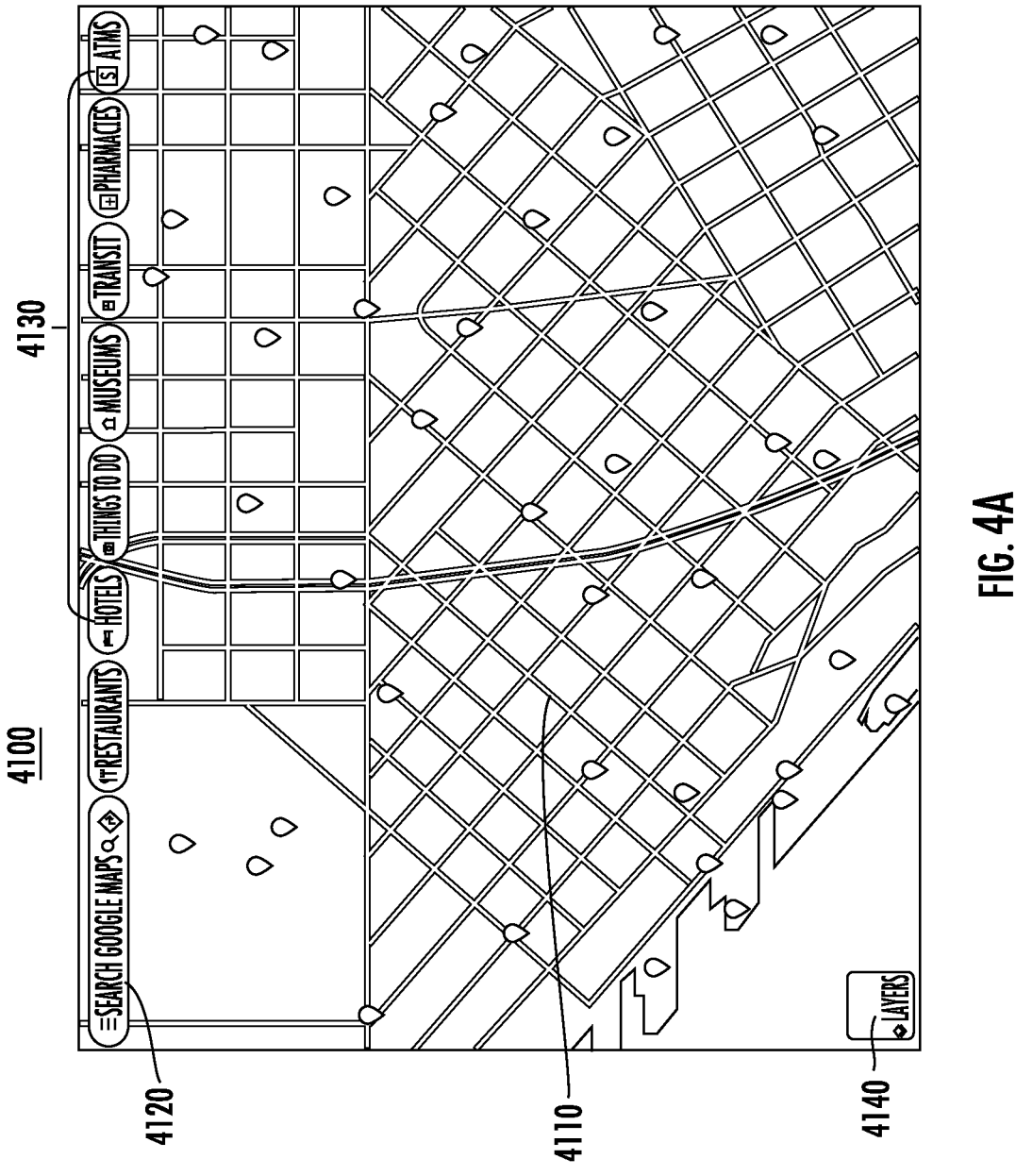
FIGS. 4A-4B illustrate example user interface screens of a mapping or navigation application, according to one or more example embodiments of the disclosure.
Figure 4B:
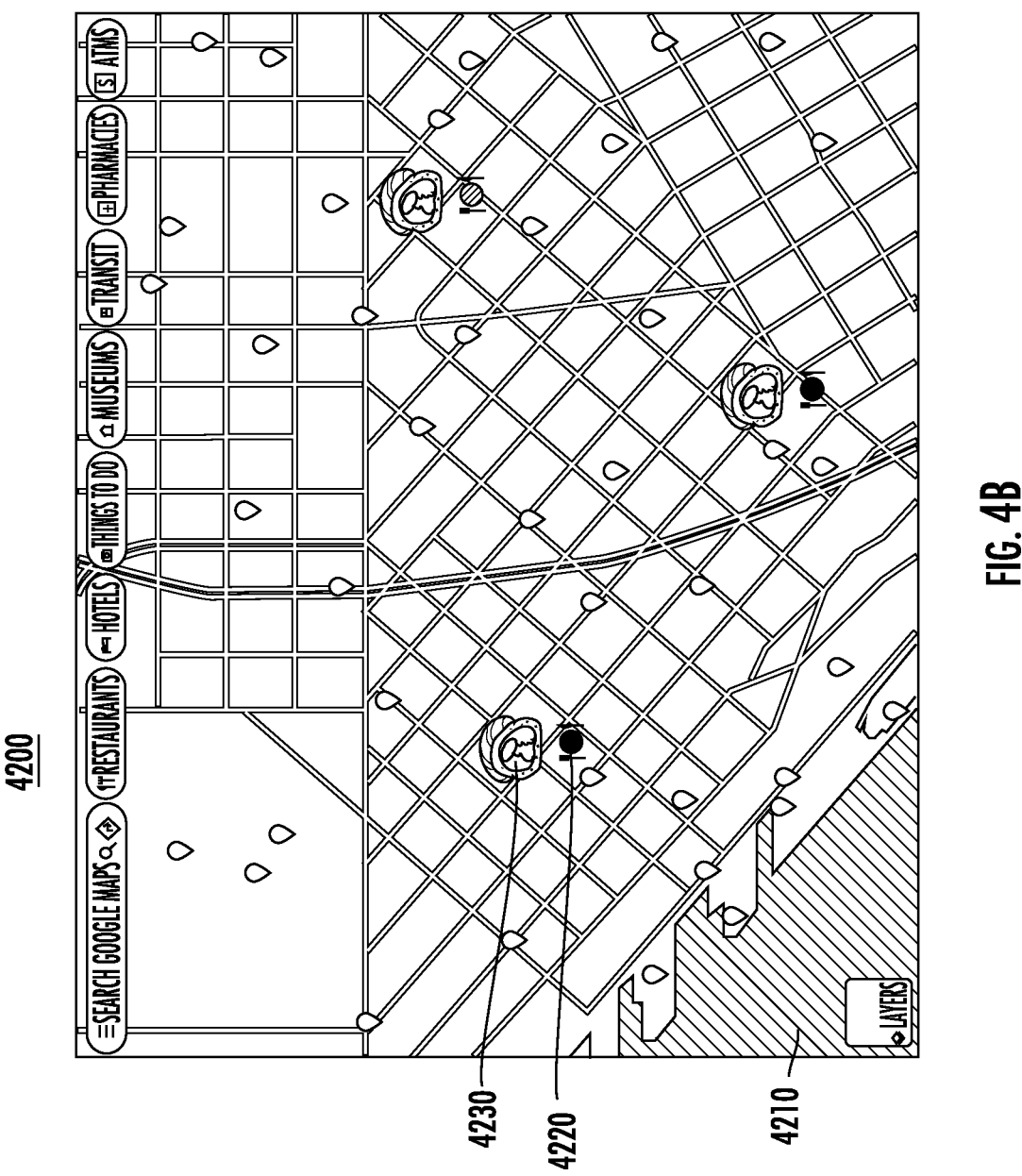
Figure 5A:
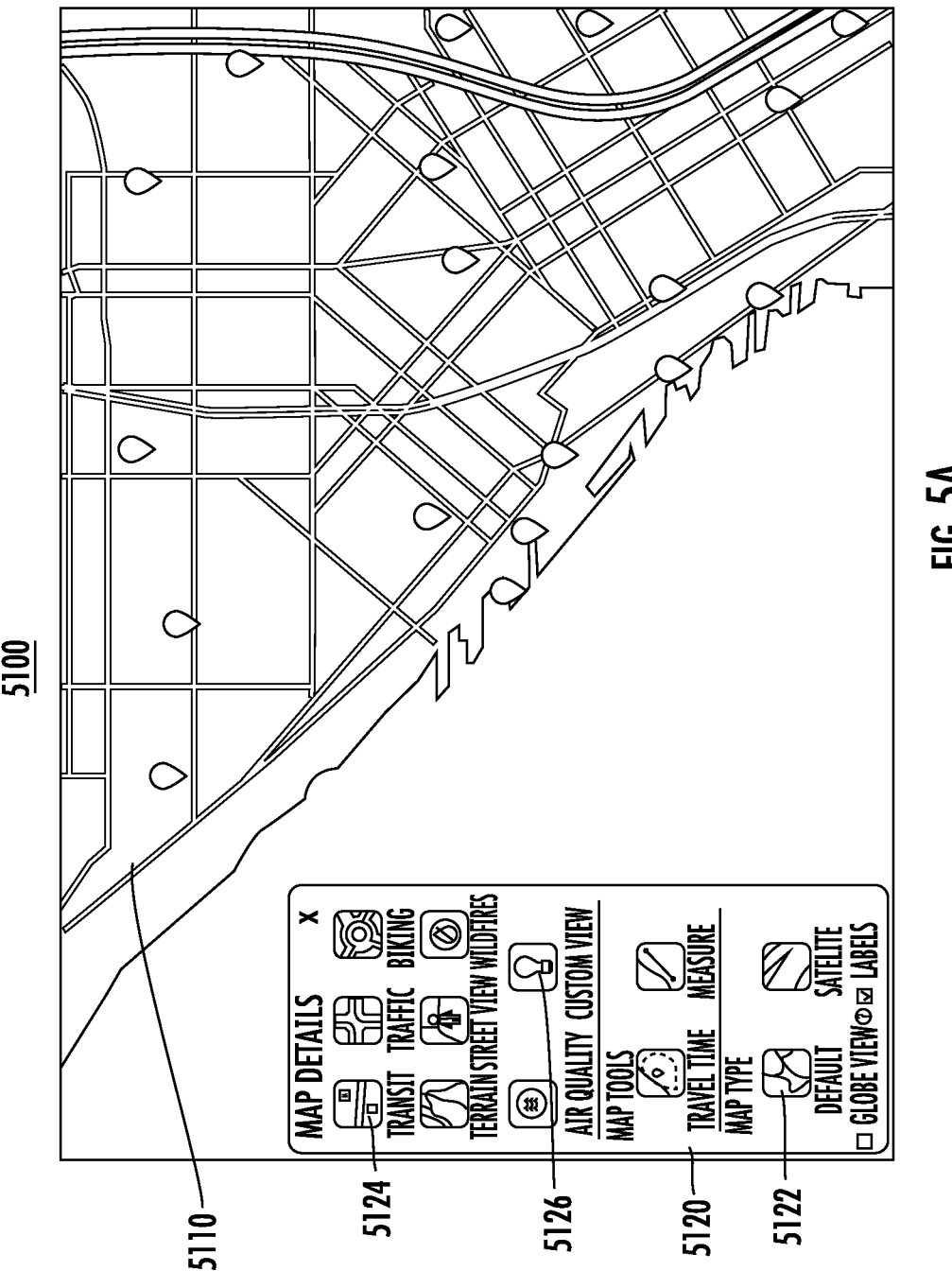
FIGS. 5A-5B illustrate example user interface screens of a mapping or navigation application, according to one or more example embodiments of the disclosure.
Figure 5B:
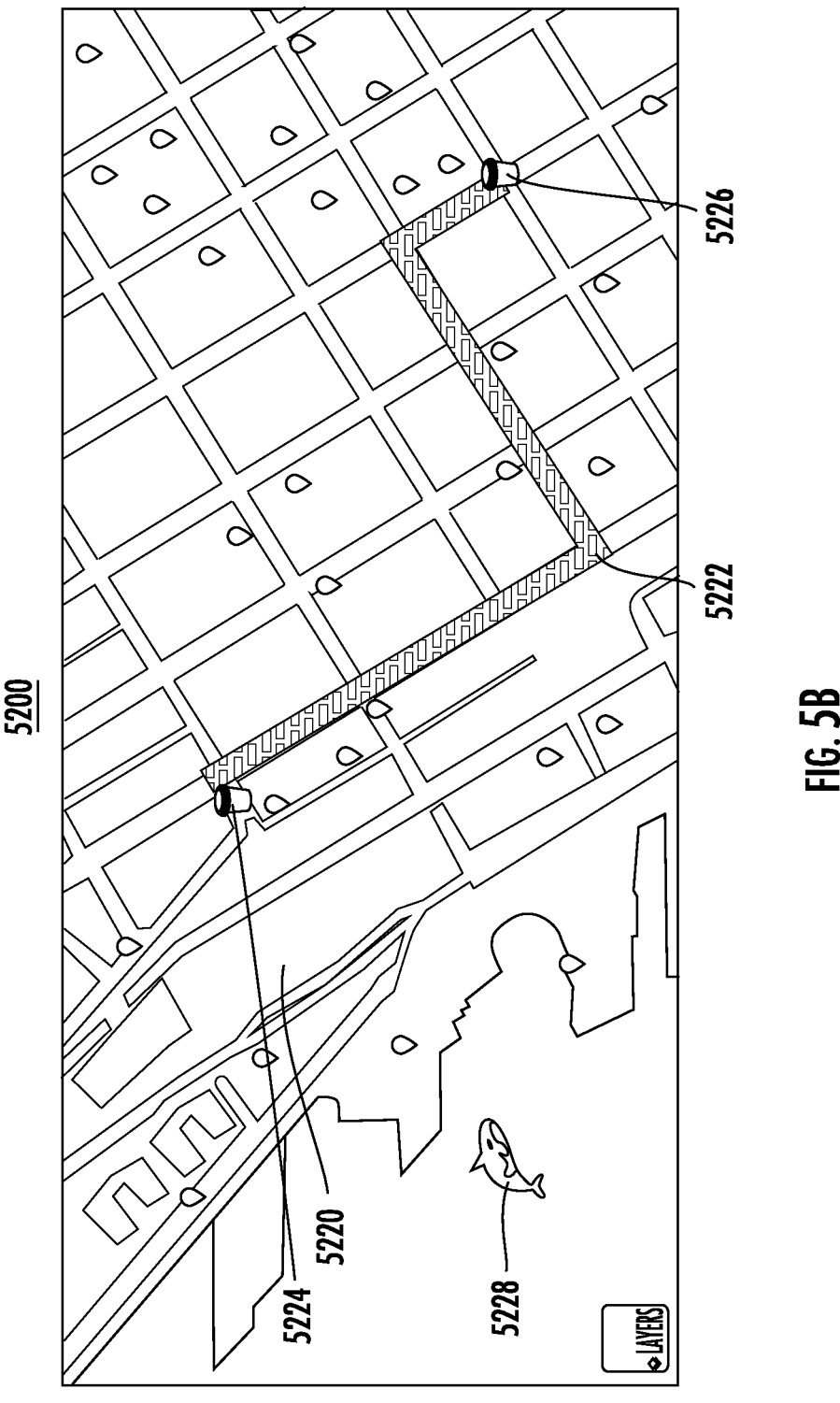

Examples of the disclosure are also directed to user-facing aspects by which a user can request a customized digital map relating to a location. For example, FIGS. 4A and 4B illustrate an example of generating a customized digital map relating to a location which can be presented on a display device associated with a user, according to one or more example embodiments of the disclosure. For example, FIGS. 5A and 5B illustrate another example of generating another customized digital map relating to a location which can be presented on a display device associated with a user, according to one or more example embodiments of the disclosure. FIG. 6 illustrates a block diagram including an example of map data layers according to example embodiments of the disclosure.

For example, FIG. 4A illustrates a user interface screen of a mapping or navigation application, according to one or more example embodiments of the disclosure. In FIG. 4A, user interface screen 4100 depicts a digital map of a location (geographic area) and includes various user interface elements to control or select options with respect to the digital map. For example, the user interface screen 4100 includes a portion 4110 which corresponds to a first map layer (e.g., a default map layer) which displays a map associated with the location, a first user interface element 4120 to provide an input and a plurality of user interface elements 4130 that, when selected, display a corresponding feature on the digital map (e.g., restaurants are displayed on the map with a corresponding icon when the user interface element corresponding to "Restaurants" is selected, hotels are displayed on the map with a corresponding icon when the user interface element corresponding to "Hotels" is selected, etc.). Other user interface elements may also be displayed (e.g., in an overlaid fashion) on the digital map (e.g., a zoom user interface element to zoom in and out of the map, an orientation user interface element to switch between different viewpoint orientations, etc.). For example, in FIG. 4A the digital map relates to the location of Seattle. First user interface element 4120 may be configured to enable a user to search for a particular location or point-of-interest, to request directions between a start point (point-of-origin) and a destination point, to provide an input requesting a customized digital map in association with the search or the request for directions, etc. For example, first user interface element 4120 may be in the form of a text box to enable a user to enter an input (e.g., in text form). However, the user may provide an input via other methods (e.g., via selection from a pull-down menu, via a voice input through a microphone, etc.).

For example, a user could provide an input via first user interface element 4120 including a text description relating to a location and the one or more generative machine-learned models 3140 may be configured to generate a detailed map of that location which is customized according to the user's input, such as by showing specific types of businesses or landmarks or by depicting the businesses or landmarks in a particular manner.

In some implementations, the generative map application 3100 may be configured to receive a semantic description of a tile associated with the digital map which is to be generated. An example semantic description can include a prompt such as "Generate a map tile of Boston Long Wharf near the Aquarium. Make the water deep blue with waves." The semantic description could include various other constraints or conditions such as "Make a coffee shop appear on the corner. The coffee shop's name is Tatte's Bakery." The user can also provide further context or inputs to the one or more generative machine-learned models 3140 to shape the output, such as by providing an image of the coffee shop's logo to render the sign and by providing size information (e.g., "Make the sign somewhat large relative to the route. Render the start pin here and the destination pin here. Make the pins look nautical themed like a boat anchor.").

In accordance with the embodiments described herein, the map displayed in the portion 4110 may be generated in response to receiving an input requesting a map of Seattle. The default map shown in FIG. 4A may be displayed using existing or default map data, for example, and may be rendered locally at the computing device 100 or at the server computing system 300 and provided to the computing device 100.

FIG. 4B illustrates another user interface screen of a mapping or navigation application, according to one or more example embodiments of the disclosure. For example, in FIG. 4B user interface screen 4200 depicts a digital map of a location (geographic area) and includes various user interface elements to control or select options with respect to the digital map similar to those described with respect to FIG. 4A. For example, the generative map application 3100 may be configured to generate the customized digital map as shown in FIG. 4B, in accordance with the embodiments as described with respect to FIGS. 2 and 3.

As an example implementation, the user may provide an input to the user interface screen 4200 requesting that a map be shown with nearby restaurants which serve sushi. The user can further specify that Elliot Bay be shown to match the city's nickname and that the map indicate in some manner whether the restaurant is open or closed. As indicated in FIG. 4B, in response to the input by the user, the generative map application 3100 may be configured to generate the customized digital map shown in FIG. 4B. For example, the generative map application 3100 may be configured to cause a water feature 4210 corresponding to Elliot Bay to be shown in an emerald green color in accordance with the city's nickname. For example, the generative map application 3100 may be configured to modify a default icon 4220 (e.g., a plate with accompanying cutlery) to indicate whether a sushi restaurant is open or closed by lighting the plate bright yellow to indicate the restaurant is open and to gray out the plate to indicate the restaurant is closed. In some implementations, the generative map application 3100 may be configured to indicate how busy the restaurant is. For example, the generative map application 3100 may fully fill the plate with the bright yellow color when the restaurant has a busyness level which exceeds a first threshold level, may fill the plate halfway with the bright yellow color when the restaurant has a busyness level which exceeds a second threshold level but is less than the first threshold level, and may fill the plate a quarter-way or less with the bright yellow color when the restaurant has a busyness level which is less than the second threshold level. For example, the generative map application 3100 may be configured to generate an icon to emphasize that the restaurant serves sushi. For example, the icon may be oversized compared to a default icon size. For example, the icon may include a graphical image 4230 of a sushi roll, for example of a type of sushi which is a favorite of the user.

According to examples of the disclosure, each user can personalize their maps experience (e.g., according to the user's tastes or needs such as targeted establishments, categories or types of routes by task, etc.). For instance, if a user wants to go grocery shopping and view grocery stores, other content which might otherwise appear on the map may be visually cluttering. The additional content also requires rendering (e.g., either at the server computing system 300 or computing device 100). Therefore, the generative map application 3100 (e.g., one or more generative machine-learned models 3140) may be configured to receive an input from the user that non-relevant content be omitted from the map, be minimized, be displayed with less detail, etc., thereby saving computing resources. Thus, the input indicates particular content which is to be omitted or reduced when generating the customized digital map. The one or more generative machine-learned models 3140 can be configured to generate the customized digital map which depicts the location with the one or more customized features by omitting or reducing the particular content when generating the customized digital map.

As another example, if a user is interested in bike paths, the one or more generative machine-learned models 3140 may be configured to focus on bike paths when generating the customized digital map. For example, the one or more generative machine-learned models 3140 may be configured to customize the map tiles in a manner that is particular to the user. For example, according to the user query or input or other conditions, the one or more generative machine-learned models 3140 may be configured to not render portions of the map unrelated to biking such that the map only shows routes which can be used for bicycling and may show only stores or facilities which are relevant to cyclists (e.g., showing bike shops while not rendering fast food restaurants). Therefore, computing resources may be efficiently utilized by rendering only portions of the map relevant to the user input.

In some implementations, the one or more generative machine-learned models 3140 may be configured to render locations or points-of-interest which may be of interest to the user. For example, the one or more generative machine-learned models 3140 may be configured to determine that a location or point-of-interest may be of interest to a user based on the user input, based on contextual information associated with the user (e.g., user preferences, past purchases of the user, historical information associated with the user, based on interests of friends of the user, etc.), based on external information (e.g., current events, local alerts, traffic alerts, etc.). The one or more generative machine-learned models 3140 may be configured to render the locations or points-of-interest in a manner that prominently displays the location or point-of-interest relative to other locations or points-of-interest (e.g., in a visually distinctive manner such as in an enlarged manner, use of bright colors, or in a highlighted manner). Further, the customized digital map can prominently display the location or point-of-interest in a stylized or thematic manner. For example, an icon or symbol representing the location or point-of-interest can match or correspond to the user input or query or can match or correspond to a context associated with the user (e.g., an icon displayed on the map representing a coffee shop may be shaped like a skateboard for a user who skateboards and is a regular coffee drinker).

In some implementations, the generative map application 3100 (e.g., one or more generative machine-learned models 3140) may be configured to utilize default tiles or starter tiles as seed data by referencing the default tiles or starter tiles (e.g., based on map information 3600) and the input to render the customized digital map which depicts the location with the one or more customized features. For example, the computing device 100 may be configured to download or store local templates including the default tiles or starter tiles received from the server computing system 300. For example, the default tiles or starter tiles may be downloaded by the computing device 100 (prior to receiving the input from the user) under particular conditions (e.g., at a time when an available bandwidth is greater than a threshold value, when network traffic is below a threshold value, when the user computing device is connected to a WiFi network or a cellular network, etc.), in association with a particular event or state of the computing device (e.g., during an initial map application or navigation application install, during updates to the map application or navigation application, etc.), or at a particular time (e.g., every week, every month, etc.).

In some implementations, the computing device 100 and server computing system 300 may be configured to perform hybrid rendering, where the computing device 100 renders a portion of the customized digital map and a remaining portion is rendered by the server computing system 300. For example, the one or more generative machine-learned models (e.g., at the computing device 100) can be configured to smooth and mix the portion of the customized digital map rendered at the server computing system 300 and the portion of the customized digital map rendered at the computing device 100 so that the overall map has a consistent and similar appearance. For example, the one or more generative machine-learned models 3140 may be provided at the computing device 100 and be configured to generate the customized digital map by rendering portions (map tiles) of the customized digital map which depicts the location with the one or more customized features, and the server computing system 300 may be configured to render portions (other map tiles) of the customized digital map which do not include or pertain to customized features (e.g., portions of the map which correspond to default map tiles).

For example, FIGS. 5A and 5B illustrate another example of generating a customized digital map relating to a location which can be presented on a display device associated with a user, according to one or more example embodiments of the disclosure.

For example, FIG. 5A illustrates a user interface screen of a mapping or navigation application, according to one or more example embodiments of the disclosure. In FIG. 5A, user interface screen 5100 depicts a digital map of a location (geographic area) and includes various user interface elements to control or select options with respect to the digital map. For example, the user interface screen 5100 includes a first portion 5110 which corresponds to a first map layer (e.g., a default map layer which corresponds to user interface element 5122) which displays a map associated with the location, and a second portion 5120 which corresponds to a menu by which various map layers can be selected. For example, the menu can be opened by selection of the user interface element 4140 as shown in FIG. 4A. In some implementations, the menu includes a plurality of user interface elements, each of which correspond to different map layers (e.g., first user interface element 5122 corresponds to the default map layer, second user interface element 5124 corresponds to a transit layer which depicts various routes travelled by transit vehicles such as bus routes, metro rail routes, etc., and a third user interface element 5126 which corresponds to a custom view layer which, when selected, can cause a customized digital map to be displayed which includes a customized map layer that is generated via one or more generative machine-learned models). For example, as shown in FIG. 5A, other selectable map layers can include a satellite layer, biking layer, terrain layer, street view layer, wildfire layer, and air quality layer. The various map layers may be included as part of map data layers 6000 as shown in FIG. 6 and stored at the computing device 100 and/or server computing system 300.

In some implementations, the customized map layer can be pre-stored (e.g., at the computing device 100) based on a customized digital map that was previously generated. For example, the customized digital map may have been previously generated via one or more generative machine-learned models based on an input and can depict a location with one or more customized features having values for one or more conditions associated with the customized features. In some implementations, the customized map layer can be generated (e.g., in real-time) in response to selection of the third user interface element 5126 by generating a customized digital map via one or more generative machine-learned models based on an input and can depict a location with one or more customized features having values for one or more conditions associated with the customized features. In some implementations, the input can be provided actively by the user after selection of the third user interface element 5126. In some implementations, the input can be obtained or inferred (e.g., by the generative map application 3100) based on various other input. For example, an input for generating the customized map layer can include known preferences of the user, historical information relating to the user, contextual information associated with the user, contextual information associated with the location, etc. The generative map application 3100 may be configured to generate a customized map layer that is appropriate for the user based one or more of these various other inputs that are not explicitly provided by the user as an input.

FIG. 5B depicts a user interface screen 5200 of a mapping or navigation application which depicts an example customized digital map relating to a location (geographic area) which can be presented on a display device associated with a user, according to one or more example embodiments of the disclosure. For example, the customized digital map can be presented for display to the user in response to a selection of the third user interface element 5126. For example, the generative map application 3100 may be configured to generate a map layer 5220 which shows a route 5222 from a start point 5224 to a destination point 5226 having one or more customized features which are personalized with respect to the user associated with the computing device. As illustrated in FIG. 5B, the generative map application 3100 may be configured to customize pins which represent the start point 5224 and destination point 5226. For example, the pins may be generated according to a user preference (e.g., a coffee cup is utilized to represent a user's favorite drink in the morning), or according to a current event (e.g., a coffee cup is utilized during national coffee week), or based on other factors. As illustrated in FIG. 5B, the generative map application 3100 may be configured to customize other map features such as the route 5222 between the start point 5224 and destination point 5226. For example, the route may be generated according to a user preference (e.g., a yellow brick road may be based on the user's favorite book), or according to contextual factors (e.g., a cobblestone road is utilized based on similar roads in the downtown area and colored based on a local sports team's colors), or based on other factors. In some implementations, an intensity of the route color can be displayed (and dynamically changed) based on a degree of traffic along the route (e.g., a darker intensity for high traffic and a lighter intensity for low traffic). As illustrated in FIG. 5B, the generative map application 3100 may be configured to generate an object 5228 associated with the location. For example, the generative map application 3100 may be configured to generate the object 5228 based on the input. In some implementations, the input may include a text query which specifies one or more objects to be associated with the location. The object may be in the form of a graphical object or image or icon, for example. As shown in FIG. 5B, the object 5228 may be an orca whale that may correspond to a favorite animal of the user, may correspond to an event celebrating orca migration season, etc. Therefore, the customized digital map shown in FIG. 5B may reflect a user's preferences and be personalized according to the user's tastes while reflecting an accurate representation of a route between navigation points using visually distinctive icons or graphical objects or images that a user can easily identify.

In some implementations, when information from the customized map layer conflicts or collides with information from another layer (e.g., one or more of the layers as shown in FIG. 6), the generative map application 3100 may be configured to prioritize the customized map layer over other map layers. For example, the customized map layer can be presented over or overwrite other information from other layers when a plurality of layers are invoked or stacked with respect to the digital map that is being displayed.

The disclosure is not limited to the example user interface elements shown in FIGS. 4A-5B, and other user interface elements may be provided by which a user can specify a request to obtain a customized digital map relating to a location (or to directions or other navigation operations with respect to the location) according to various conditions or inputs. For example, user interface elements may be in the form of a pull-down menu, a selectable user interface element, a text box, and the like. The input may also be provided via a voice prompt.

FIG. 6 depicts a block diagram including example map data layers according to example embodiments of the disclosure. One or more portions of map data layers 6000 can be stored on one or more computing devices using any suitable memory. In some examples, map data layers 6000 can be executed or implemented on one or more computing devices or computing systems including, for example, the computing device 100 and/or server computing system 300.

As shown in FIG. 6, the map data layers 6000 includes a plurality of layers, examples of which may include a local coordinate system layer 6002, a location layer 6004, a plan layer 6006, a signs layer 6008, a traffic control devices layer 6010, a landmarks layer 6012, a hazards layer 6014, a default map layer 6016, a transit layer 6018, and a custom view layer 6020.

The plurality of layers in the map data layers 6000 can be accessed by one or more computing systems and/or one or more computing devices including the computing device 100 and/or server computing system 300. The generative map application 3100 (e.g., the one or more generative machine-learned models 3140) may be configured to reference information from the map data layers 6000 to generate the customized digital map in response to receiving an input and/or in response to selection of the third user interface element 5126. As described herein, in some implementations the generative map application 3100 (e.g., the one or more generative machine-learned models 3140) may be configured to prioritize data or information from the custom view layer 6020 over data or information from one of the other map data layers.

The local coordinate system layer 6002 can include data and/or information associated with a coordinate system (e.g., x, y, and z coordinates corresponding to latitude, longitude, and altitude respectively) including the current coordinate system used by the computing device 100 and/or server computing system 300.

The location layer 6004 can include data and/or information associated with a self-consistent description of an instantaneous location of the computing device 100 (e.g., the location of the computing device 100 at the current moment in time). This location can be associated with aspects including the computing device's 100 physical location (e.g., pose within the world or local coordinate frame, absolute velocity and/or acceleration) or the computing device's 100 semantic location (e.g., a road segment the computing device 100 is currently on and where the computing device 100 is on the road segment, scalar velocity along the segment, and/or which lane the computing device 100 is in, etc.).

The plan layer 6006 can be used to annotate a local road and lane graph according to the current plan or route. The plan layer 6006 can enable the computing device 100 to determine which roads or lanes ahead are to be followed for a current navigation route. The plan layer 6006 can include the identities of planned roads and lanes ahead of the vehicle within the vehicle horizon. The plan layer 6006 can be managed as part of a navigation interface. A route can be selected by searching for a destination, viewing possible routes, and initiating turn-by-turn navigation. Once the computing device 100 is in transit, the route can automatically update and recalculate as needed to adjust for driving behavior and road or traffic changes.

The signs layer 6008 can include data and/or information associated with physical signs visible from road segments, including sign type, contents, and three-dimensional position information. For example, signs can include speed limit signs observed when traveling on a road, including the speed limit text on the sign. Signs can be classified into sign types including speed limit or road names.

The traffic control devices layer 6010 can be used to describe the locations, attributes, and state of traffic control devices, including stoplights and/or stop signs. The traffic control devices layer can include indications for the operational status of traffic control devices (e.g., operational, non-operational, or malfunctioning).

The landmarks layer 6012 can be used to describe landmarks visible from the road and can include the three-dimensional position of each landmark. Further, the landmarks layer 6012 can be used for localization. Attributes of the landmarks layer 6012 include a position including coordinates (e.g., x, y, z, coordinates corresponding to latitude, longitude, and altitude) that can be used to determine the position of the landmark; and a visibility that can be used to determine a distance from which the landmark is visible based on the vantage point (e.g., the vantage point of a vehicle at a particular location). The landmarks layer 6012 can be updated in the event that a landmark is removed or relocated.

The hazards layer 6014 can include data and/or information associated with annotation of roads and lanes with traffic incidents, hazards, and/or blockages. For example, hazards can include areas undergoing construction, natural hazards (e.g., flooding, fire, heavy rain, and/or heavy snowfall), and other potentially harmful events that can obstruct or delay the movement of a vehicle.

The default map layer 6016 can include data and/or information associated with a default map layer and can provide a digital map view which uses a combination of light and earth-like tones to depict forms of terrain and urbanized areas.

The transit map layer 6018 can include data and/or information which indicates transit options including subways, metro routes, bus stations, etc.

The custom view map layer 6020 can include data and/or information which corresponds to a customized digital map that is generated via one or more generative machine-learned models as described herein based on an input from a user which indicates various features to be customized (e.g., according to a user preference).

Various other map data layers can be provided as part of map data layers 6000 which are not depicted in FIG. 6. For example, other map data layers can include a traffic layer, satellite layer, air quality layer, biking layer, terrain layer, street view layer, wildfire layer, fog layers, parking layer, road layer, lane layer, etc.

Figure 7A:
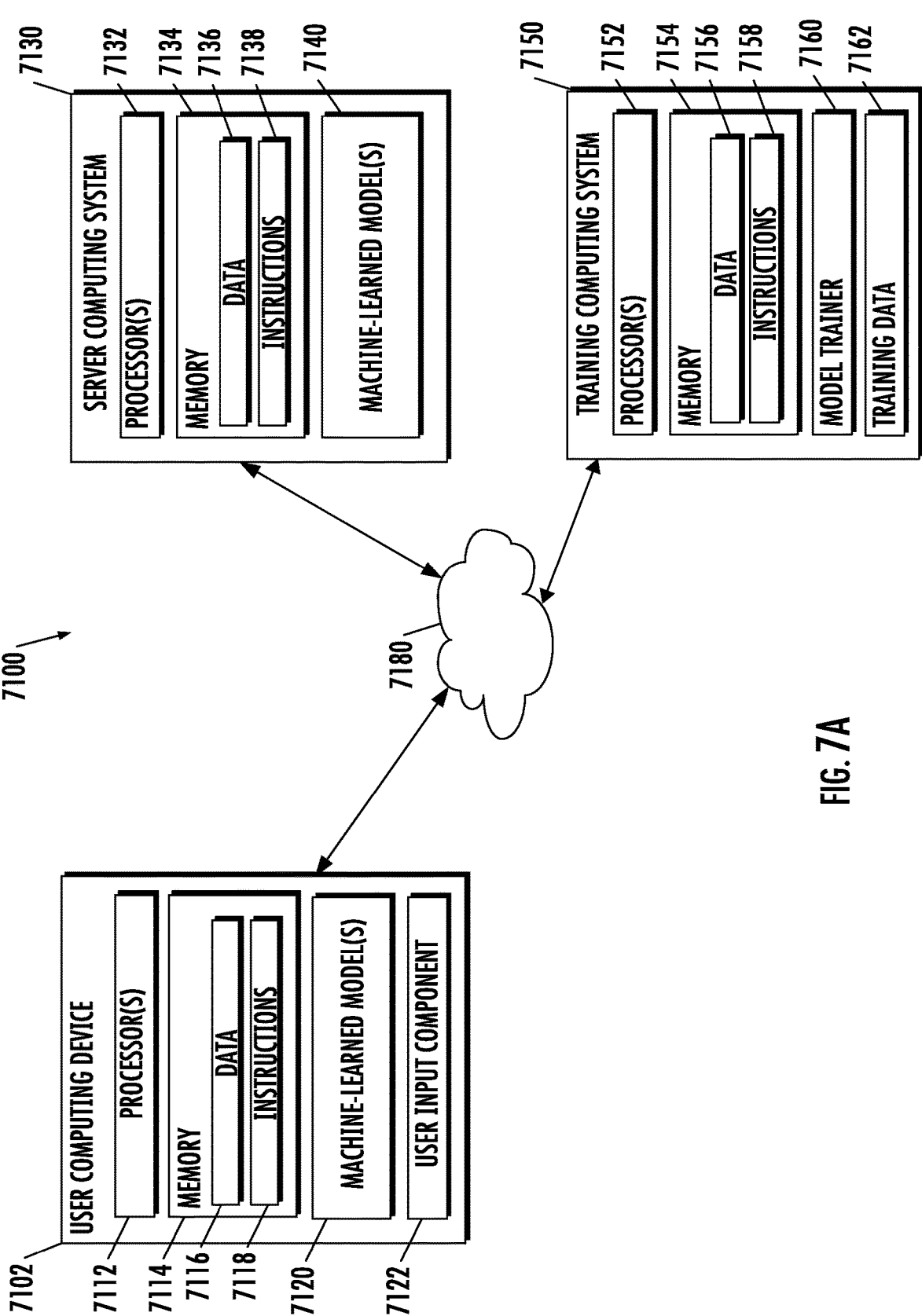
FIG. 7A depicts a block diagram of an example computing system for generating a customized digital map via a generative machine-learned model in response to receiving an input, according to one or more example embodiments of the disclosure.

FIG. 7A depicts a block diagram of an example computing system for generating a customized digital map via a generative machine-learned model in response to receiving an input or query, according to one or more example embodiments of the disclosure. The system 7100 includes a user computing device 7102, a server computing system 7130, and a training computing system 7150 that are communicatively coupled over a network 7180.

Figure 7B:
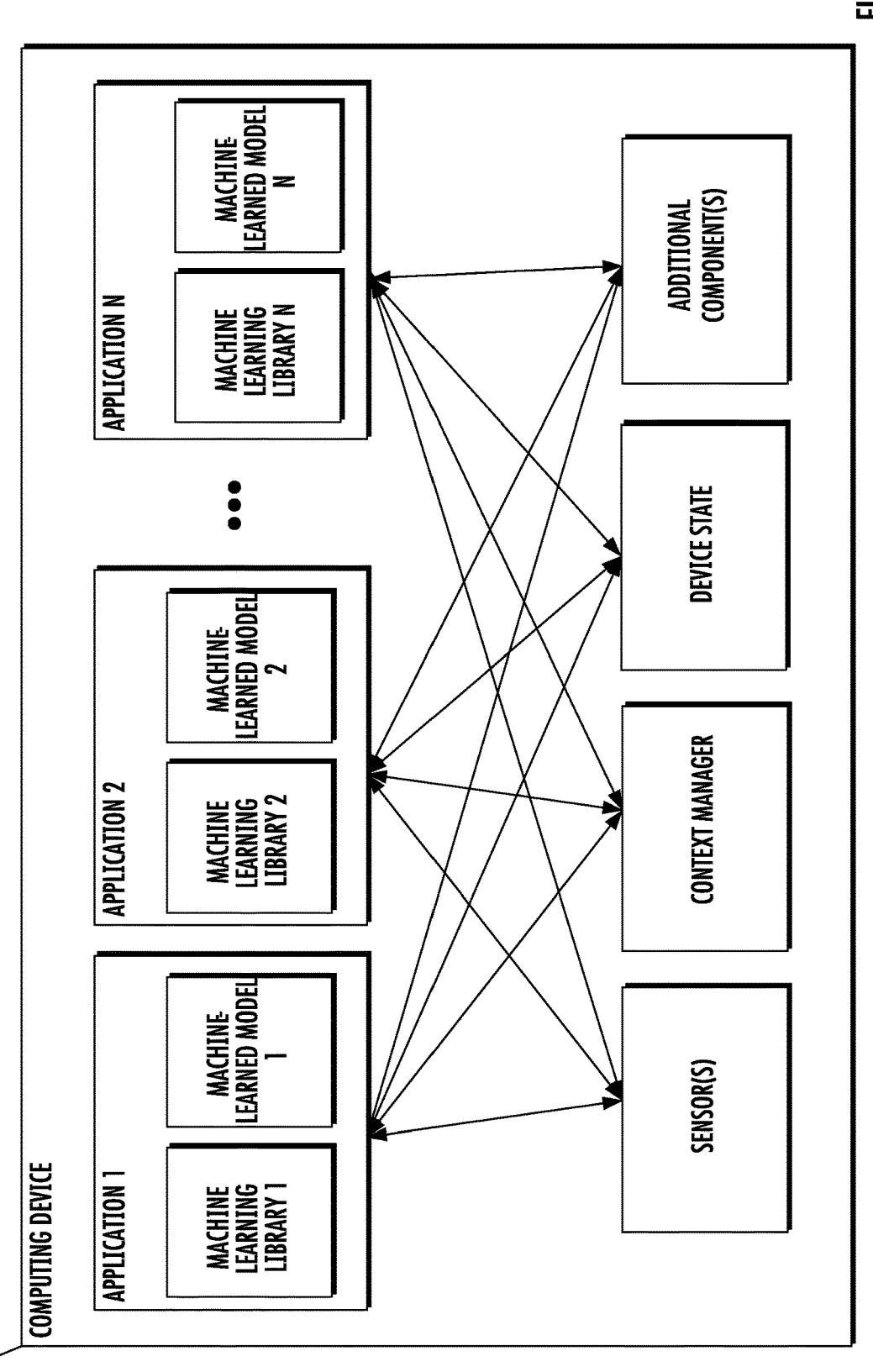
FIG. 7B depicts a block diagram of an example computing device for generating a customized digital map via a generative machine-learned model in response to receiving an input, according to one or more example embodiments of the disclosure.

FIG. 7B depicts a block diagram of an example computing device for generating a customized digital map via a generative machine-learned model in response to receiving an input or query, according to one or more example embodiments of the disclosure.

Figure 7C:
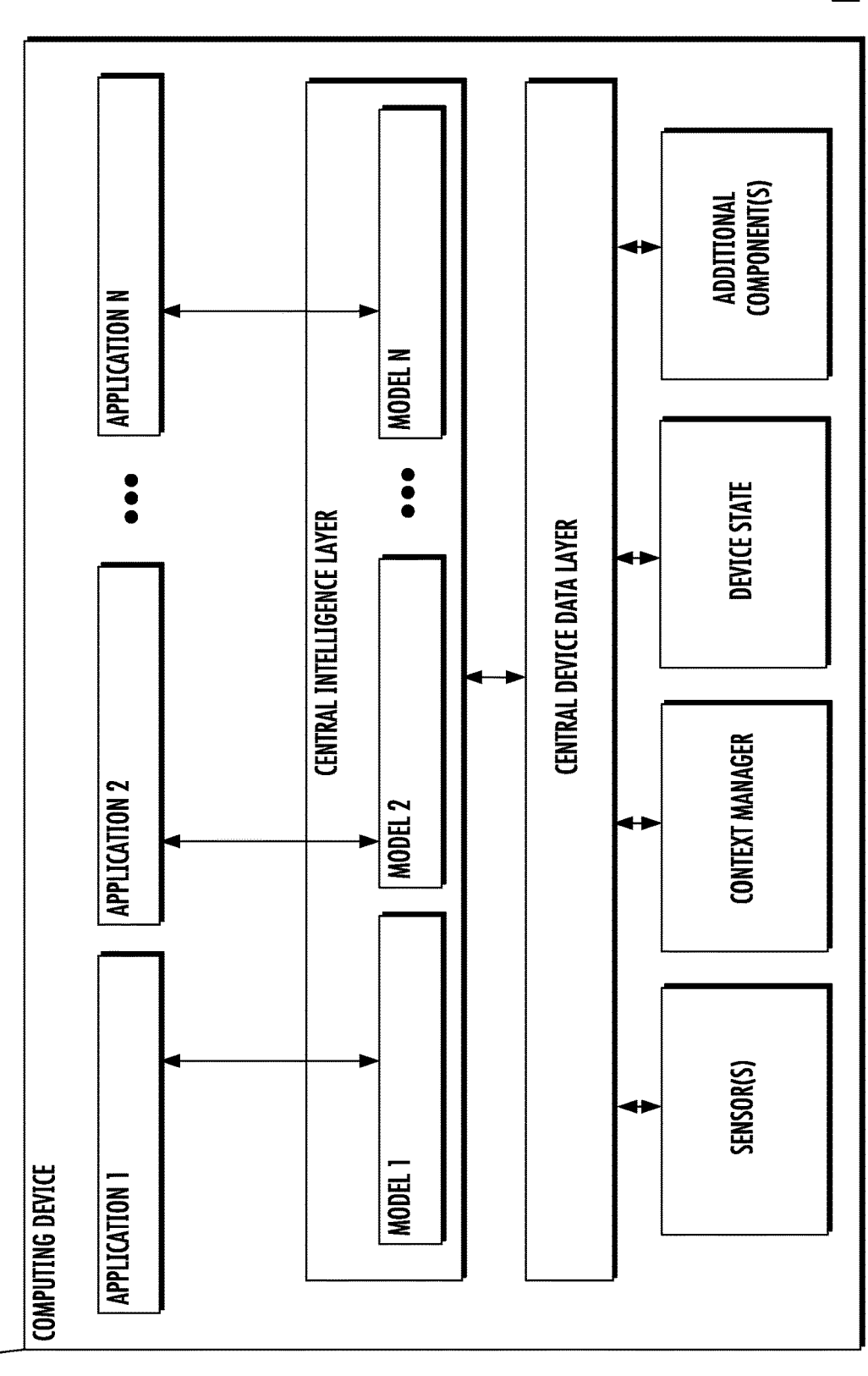
FIG. 7C depicts a block diagram of an example computing device for generating a customized digital map via a generative machine-learned model in response to receiving an input, according to one or more example embodiments of the disclosure.

FIG. 7C depicts a block diagram of an example computing device for generating a customized digital map via a generative machine-learned model in response to receiving an input or query, according to one or more example embodiments of the disclosure.

The user computing device 7102 (which may correspond to computing device 100) can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 7102 includes one or more processors 7112 and a memory 7114. The one or more processors 7112 can be any suitable processing device (e.g., a processor core, a microprocessor, an ASIC, an FPGA, a controller, a microcontroller, etc.) and can be one processor or a plurality of processors that are operatively connected. The memory 7114 can include one or more non-transitory computer-readable storage media, such as RAM, ROM, EEPROM, EPROM, flash memory devices, magnetic disks, etc., and combinations thereof. The memory 7114 can store data 7116 and instructions 7118 which are executed by the processor 7112 to cause the user computing device 7102 to perform operations.

In some implementations, the user computing device 7102 can store or include one or more machine-learned models 7120 (e.g., large language models, sequence processing models, generative machine-learned models, etc.). For example, the one or more machine-learned models 7120 can be or can otherwise include various machine-learned models such as neural networks (e.g., deep neural networks) or other types of machine-learned models, including non-linear models and/or linear models. Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models (e.g., transformer models). Example machine-learned models were described herein with reference to FIGS. 1A through 6.

In some implementations, the one or more machine-learned models 7120 can be received from the server computing system 7130 over network 7180, stored in the memory 7114, and then used or otherwise implemented by the one or more processors 7112. In some implementations, the user computing device 7102 can implement multiple parallel instances of a single machine-learned model (e.g., to perform parallel tasks across multiple instances of the machine-learned model). In some implementations, the task is a generative task and one or more machine-learned models may be implemented to output content (e.g., a customized digital map) in view of various inputs (e.g., a query, conditioning parameters, etc.). More particularly, the machine-learned models disclosed herein (e.g., including large language models, sequence processing models, generative machine-learned models, etc.), may be implemented to perform various tasks related to an input query.

According to examples of the disclosure, a computing system may implement one or more sequence processing models 3120 as described herein to output values for the one or more conditions in response to or based on the query. The one or more sequence processing models 3120 may include one or more machine-learned models which are configured to process and analyze sequential data and to handle data that occurs in a specific order or sequence, including time series data, natural language text, or any other data with a temporal or sequential structure.

According to examples of the disclosure, a computing system may implement one or more large language models 3130 to determine a plurality of variables based on the query. For example, a large language model may include a Bidirectional Encoder Representations from Transformers (BERT) large language model. The large language model may be trained to understand and process natural language for example. The large language model may be configured to extract information from the input (query) to identify keywords, intents, and context within the input to determine a plurality of variables for generating the customized digital map. The variables may include latent variables that represent an underlying structure of the language.

According to examples of the disclosure, a computing system may implement one or more generative machine-learned models 3140 to generate the customized digital map that depicts a location with one or more customized features having values for one or more conditions associated with the customized features. The one or more generative machine-learned models 3140 may include a deep neural network or a generative adversarial network (GAN) to generate the customized digital map that depicts the location with one or more customized features having values for one or more conditions associated with the customized features. For example, the one or more generative machine-learned models 3140 may include variational autoencoders, stable diffusion machine-learned models, visual transformers, neural radiance fields (NeRFs), etc., to generate the customized digital map which depicts the location with one or more customized features with values for conditions associated with the one or more customized features.

Additionally, or alternatively, one or more machine-learned models 7140 can be included in or otherwise stored and implemented by the server computing system 7130 that communicates with the user computing device 7102 according to a client-server relationship. For example, the one or more machine-learned models 7140 can be implemented by the server computing system 7130 as a portion of a web service (e.g., a navigation service, a mapping service, and the like). Thus, one or more machine-learned models 7120 can be stored and implemented at the user computing device 7102 and/or one or more machine-learned models 7140 can be stored and implemented at the server computing system 7130.

The user computing device 7102 can also include one or more user input components 7122 that receives user input. For example, the user input component 7122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other devices and methods by which a user can provide a user input.

The server computing system 7130 (which may correspond to server computing system 300) includes one or more processors 7132 and a memory 7134. The one or more processors 7132 can be any suitable processing device (e.g., a processor core, a microprocessor, an ASIC, an FPGA, a controller, a microcontroller, etc.) and can be one processor or a plurality of processors that are operatively connected.

The memory 7134 can include one or more non-transitory computer-readable storage media, such as RAM, ROM, EEPROM, EPROM, flash memory devices, magnetic disks, etc., and combinations thereof. The memory 7134 can store data 7136 and instructions 7138 which are executed by the processor 7132 to cause the server computing system 7130 to perform operations.

In some implementations, the server computing system 7130 includes or is otherwise implemented by one or more server computing devices. In instances in which the server computing system 7130 includes a plurality of server computing devices, such server computing devices can operate according to sequential computing architectures, parallel computing architectures, or some combination thereof.

As described above, the server computing system 7130 can store or otherwise include one or more machine-learned models 7140. For example, the one or more machine-learned models 7140 can be or can otherwise include various machine-learned models. Example machine-learned models include neural networks or other multi-layer non-linear models. Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models (e.g., transformer models). Example machine-learned models were described herein with reference to FIGS. 1A through 6.

The user computing device 7102 and/or the server computing system 7130 can train the one or machine-learned models 7120 and/or 7140 via interaction with the training computing system 7150 that is communicatively coupled over the network 7180. The training computing system 7150 can be separate from the server computing system 7130 or can be a portion of the server computing system 7130.

The training computing system 7150 includes one or more processors 7152 and a memory 7154. The one or more processors 7152 can be any suitable processing device (e.g., a processor core, a microprocessor, an ASIC, an FPGA, a controller, a microcontroller, etc.) and can be one processor or a plurality of processors that are operatively connected. The memory 7154 can include one or more non-transitory computer-readable storage media, such as RAM, ROM, EEPROM, EPROM, flash memory devices, magnetic disks, etc., and combinations thereof. The memory 7154 can store data 7156 and instructions 7158 which are executed by the processor 7152 to cause the training computing system 7150 to perform operations. In some implementations, the training computing system 7150 includes or is otherwise implemented by one or more server computing devices.

The training computing system 7150 can include a model trainer 7160 that trains the one or more machine-learned models 7120 and/or 7140 stored at the user computing device 7102 and/or the server computing system 7130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 7160 can perform a number of generalization techniques (e.g., weight decays, dropouts, etc.) to improve the generalization capability of the models being trained.

In particular, the model trainer 7160 can train the one or more machine-learned models 7120 and/or 7140 based on a set of training data 7162. The training data 7162 can include, for example, various datasets which may be stored remotely or at the training computing system 7150. For example, in some implementations an example dataset utilized for training includes a plurality of digital maps relating to a particular location, a plurality of images relating to a particular location, etc. However, other datasets of images and digital maps may be utilized (e.g., images and digital maps from external websites). In some implementations, the dataset may be confined to a particular category, genre, terrain, landmark, time, etc. In some implementations, the dataset may contain diverse subject matter including objects, terrain, individuals, groups of people, landmarks, structures, etc.

In some implementations, if the user has provided consent, the training examples can be provided by the user computing device 7102. Thus, in such implementations, the one or more machine-learned models 7120 provided to the user computing device 7102 can be trained by the training computing system 7150 on user-specific data received from the user computing device 7102. In some instances, this process can be referred to as personalizing the model.

The model trainer 7160 includes computer logic utilized to provide desired functionality. The model trainer 7160 can be implemented in hardware, firmware, and/or software controlling a general purpose processor. For example, in some implementations, the model trainer 7160 includes program files stored on a storage device, loaded into a memory and executed by one or more processors. In other implementations, the model trainer 7160 includes one or more sets of computer-executable instructions that are stored in a tangible computer-readable storage medium such as RAM, hard disk, or optical or magnetic media.

The network 7180 can be any type of communications network, such as a local area network (e.g., intranet), wide area network (e.g., Internet), or some combination thereof and can include any number of wired or wireless links. In general, communication over the network 7180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output.

As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

FIG. 7A illustrates an example computing system that can be used to implement aspects of the disclosure. Other computing systems can be used as well. For example, in some implementations, the user computing device 7102 can include the model trainer 7160 and the training data 7162. In such implementations, the one or more machine-learned models 7120 can be both trained and used locally at the user computing device 7102. In some of such implementations, the user computing device 7102 can implement the model trainer 7160 to personalize the one or more machine-learned models 7120 based on user-specific data.

FIG. 7B depicts a block diagram of an example computing device for generating a customized digital map via a generative machine-learned model in response to receiving a query, according to one or more example embodiments of the disclosure. The computing device 7200 can be a user computing device or a server computing device.

The computing device 7200 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, a map application, a navigation application, etc.

As illustrated in FIG. 7B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 7C depicts a block diagram of an example computing device for generating a customized digital map via a generative machine-learned model in response to receiving a query, according to one or more example embodiments of the disclosure. The computing device 70 can be a user computing device or a server computing device.

The computing device 7300 includes a number of applications (e.g., applications 1 through N). Each application is in communication with a central intelligence layer. Example applications include a text messaging application, an email application, a dictation application, a virtual keyboard application, a browser application, a map application, a navigation application, etc. In some implementations, each application can communicate with the central intelligence layer (and model(s) stored therein) using an API (e.g., a common API across all applications).

The central intelligence layer includes a number of machine-learned models. For example, as illustrated in FIG. 7C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 7300.

The central intelligence layer can communicate with a central device data layer. The central device data layer can be a centralized repository of data for the computing device 7300. As illustrated in FIG. 7C, the central device data layer can communicate with a number of other components of the computing device, such as, for example, one or more sensors, a context manager, a device state component, and/or additional components. In some implementations, the central device data layer can communicate with each device component using an API (e.g., a private API).

To the extent alleged generic terms including "module", and "unit," and the like are used herein, these terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computing device for generating a customized digital map, comprising:
    a display device;
    one or more memories configured to store instructions; and
    one or more processors configured to execute the instructions to perform operations, the operations comprising:
        providing, for presentation to a user associated with the computing device, a digital map of a location which includes a plurality of graphical objects representing at least one of a point-of-interest, a geographic feature, or a path of travel;

receiving an input from a user relating to customizing features associated with at least one of the plurality of graphical objects;

based on receiving the input, implementing a generative machine-learned model to generate the customized digital map which depicts the location including the at least one of the plurality of graphical objects having the one or more customized features which are generated via the generative machine-learned model based on the input; and providing the customized digital map for presentation via the display device.

2. The computing device of claim 1, wherein the generative machine- learned model is provided at the computing device.

3. The computing device of claim 1, wherein receiving the input from the user relating to customizing features comprises receiving a semantic description of a tile associated with the digital map which is to be generated.

4. The computing device of claim 2, wherein the generative machine-learned model is configured to generate the customized digital map by rendering a portion of the customized digital map which depicts the location with the one or more customized features, and the operations further comprise receiving a remaining portion of the customized digital map rendered by a server computing system.

5. The computing device of claim 4, wherein the operations further comprise implementing one or more machine-learned models to smooth and mix the portion of the customized digital map rendered by the computing device and the remaining portion of the customized digital map rendered by the server computing system.

6. The computing device of claim 1, wherein the operations further comprise receiving, prior to receiving the input from the user, one or more default tiles associated with the location, and the generative machine-learned model is configured to generate the customized digital map by referencing the one or more default tiles and the input to render the customized digital map which depicts the location with the one or more customized features.

7. The computing device of claim 6, wherein the one or more default tiles associated with the location are received at a predetermined time, in accordance with a predetermined condition, or in accordance with a predetermined event.

8. The computing device of claim 7, wherein the predetermined time occurs periodically, the predetermined condition is associated with network conditions of a network by which the one or more default tiles are received from a server computing system, and the predetermined event is associated with a state of the computing device.

9. The computing device of claim 1, wherein the input indicates particular content which is to be omitted or reduced when generating the customized digital map, and implementing the generative machine-learned model to generate the customized digital map comprises omitting or reducing the particular content when generating the customized digital map.

10. The computing device of claim 1, wherein receiving the input from the user relating to customizing features comprises receiving a selection of a user interface element which corresponds to a customized map layer, and the generative machine-learned model is implemented to generate the customized digital map based on the selection of the user interface element.

11. The computing device of claim 10, wherein the operations further comprise, based on the selection of the user interface element, generating the customized map layer based on at least one of information associated with the user or contextual information associated with the location.

12. The computing device of claim 1, wherein the computing device comprises one or more databases configured to store a plurality of generative machine-learned models respectively associated with a plurality of different locations, and the operations further comprise retrieving, from among the plurality of generative machine-learned models, the generative machine-learned model associated with the location.

13. The computing device of claim 1, wherein the input comprises a text query that specifies one or more graphical objects to be associated with the location.

14. The computing device of claim 1, wherein the generative machine-learned model has been fine-tuned based on a large parameter generative machine-learned model having a greater number of parameters than the generative machine-learned model.

15. A computer-implemented method for generating a customized digital map, comprising:

providing, for presentation to a user associated with a computing device, a digital map of a location which includes a plurality of graphical objects representing at least one of a point-of- interest, a geographic feature, or a path of travel;

receiving, by the computing device, an input from a user relating to customizing features associated with at least one of the plurality of graphical objects;

based on receiving the input, implementing, by the computing device, a generative machine-learned model to generate the customized digital map which depicts the location including the at least one of the plurality of graphical objects having the one or more customized features which are generated via the generative machine-learned model based on the input; and providing, by the computing device, the customized digital map for presentation via a display device.

16. The computer-implemented method of claim 15, wherein the generative machine-learned model is provided at the computing device.

17. The computer-implemented method of claim 15, wherein receiving the input from the user relating to customizing features comprises receiving a semantic description of a tile associated with the digital map which is to be generated.

18. The computer-implemented method of claim 15, wherein implementing the generative machine-learned model comprises:

rendering a portion of the customized digital map which depicts the location with the one or more customized features, and receiving a remaining portion of the customized digital map rendered by a server computing system.

19. The computer-implemented method of claim 15, wherein the input indicates particular content which is to be omitted or reduced when the customized digital map is generated, and implementing the generative machine-learned model comprises omitting or reducing the particular content when generating the customized digital map.

20. A non-transitory computer readable medium storing instructions which, when executed by one or more processors, cause the one or more processors to perform operations for generating a customized digital map, the operations comprising:

providing, for presentation to a user associated with a computing device, a digital map of a location which includes a plurality of graphical objects representing at least one of a point-of-interest, a geographic feature, or a path of travel;

receiving an input from a user relating to customizing features associated with at least one of the plurality of graphical objects;

based on receiving the input, implementing a generative machine-learned model to generate a customized digital map which depicts the location including the at least one of the plurality of graphical objects having the one or more customized features which are generated via the generative machine-learned model based on the input; and providing the customized digital map for presentation via a display device.

\* \* \* \* \*